United States Patent [19]
Kramer

[11] Patent Number: 5,038,284
[45] Date of Patent: Aug. 6, 1991

[54] METHOD AND APPARATUS RELATING TO CONDUCTING TRADING TRANSACTIONS WITH PORTABLE TRADING STATIONS

[76] Inventor: Robert M. Kramer, 104 W. 70th St., New York, N.Y. 10023

[21] Appl. No.: 157,963

[22] Filed: Feb. 17, 1988

[51] Int. Cl.⁵ .................................. G06F 15/20
[52] U.S. Cl. .......................... 364/408; 340/825.76; 340/825.27
[58] Field of Search .................. 364/408, 401; 340/825.27, 825.26, 825.25

[56] References Cited

U.S. PATENT DOCUMENTS

| | | | |
|---|---|---|---|
| 3,500,327 | 3/1970 | Belcher | 340/825.27 |
| 3,573,747 | 4/1971 | Adams | 364/408 |
| 3,976,840 | 8/1976 | Cleveland et al. | 340/825.26 |
| 4,019,174 | 4/1977 | Vanderpoor | 364/900 |
| 4,334,190 | 6/1980 | Sochaczevski | 364/565 |
| 4,412,287 | 10/1983 | Braddock | 364/408 |
| 4,447,872 | 5/1984 | Nothaft | 340/825.26 |
| 4,486,853 | 12/1984 | Parsons | 364/900 |
| 4,611,306 | 9/1986 | Crehan et al. | 364/900 |
| 4,674,044 | 1/1987 | Kalmns | 364/408 |
| 4,677,434 | 6/1987 | Fascenda | 340/825.26 |
| 4,677,552 | 1/1987 | Sibley | 364/408 |
| 4,694,397 | 9/1987 | Grant | 364/408 |

FOREIGN PATENT DOCUMENTS 0579798 7/1986 Fed. Rep. of Germany.
0204056 10/1985 Japan.

*Primary Examiner*—Gail O. Hayes

[57] ABSTRACT

A central computer equipped with communications hardware and specially designed software receives transaction data from personal transaction stations operated by traders, sends back verification information to the traders, reconciles all trades, informs traders when an error occurs, generates complete records of all transactions, reports price and volume data to quote vendors, provides numerous reports which analyze trading activity to detect potential regulatory violations, creates a complete real-time backup copy of all data, and provides intraday profit, loss, risk, and margin information to exchange and Futures Commission Merchant personnel.

32 Claims, 23 Drawing Sheets

METHOD AND APPARATUS RELATING TO CONDUCTING TRADING TRANSACTIONS WITH PORTABLE TRADING STATIONS

FIELD OF INVENTION

This invention relates to methods and apparatus or systems for the handling of trader transactions and, more particularly, to systems and methods for maintaining substantially real time monitoring of the transactions of traders of commodities and the like, as well as processing and maintaining records relating to the buying and selling of commodities and the like.

BACKGROUND

The method by which commodities are traded on all or nearly all of the regulated commodity exchanges is called the "open outcry" system in which traders (local market makers, brokers and arbitrageurs) shout their bids and offers openly so that anyone may have the opportunity to accept any bid or pay any offer. When a transaction is executed, each trader writes the details of the transaction on his trading card including the designation of the contra party and the time of the trade so that reconciliation of the transaction (matching both sides of a trade) can be accomplished. The trading cards are standard multipart forms with minor differences reflecting the name and numerical designation of the clearing broker (the Futures Commission Merchant or FCM), and possibly aesthetic preferences. Each card has spaces for approximately 10 transactions and can be used only within the half-hour time bracket in which it was first used because cards are then collected by clerks to reconcile all trades. This is done each half hour so that most errors can be detected and corrected quickly, hopefully before the end of trading that day. When trading activity is very hectic and voluminous, this method of reconciliation is not as effective a desired and it is at such times that errors are most likely made and when errors are typically most costly.

Immediate reconciliation of trades would be a great advantage to traders who are handling many or large orders because errors may put them at enormous risk, as evidenced by the stock index futures traders who were forced out of business as a result of the stock market crash of October 1987. Depending on how the potential errors may occur, traders may find themselves to be long or short a large number of futures contracts when their desire was in fact to have no position. If they do not realize that an error has occurred until the next day, market gyrations can bankrupt them.

The situation does not stop with the trader's losses, however, because his FCM guarantees his trades to the Commodity Clearing Corporation (which stands between all buyers and sellers) and thus stands to lose whatever the trader either can't pay or refuses to pay. It is vital, therefore, that the FCM receives accurate reconciliation as quickly as possible.

The presently used method of clearing all trades requires an enormous keypunching effort each day and evening when every trade that was executed during the trading session has to be entered into the FCM's computer system. During this process, errors are introduced which produce an additional burden of detection and correction the following day. Implementation of the system proposed herein will eliminate all of the keypunching related to trades done by floor traders as principal, and most of the keypunching for customer trades.

The method by which transactions are reported to the public via the quote vendors generally involves clerks, who are called reporters, standing at strategic locations around the trading pit marking mark-sense cards as they see and hear transactions being consummated or quotations being made. An improvement to this procedure at some exchanges is the use of keyboards instead of marksense cards.

Use of the present invention, as will be discussed hereinafter, will eliminate the need for most reporters because the quote reporting will be automatic as a result of traders' entering actual trades or actual quotations. Accurate volume numbers will, therefore, be available which is not possible with the current technique. Additional powerful incentives for traders to report their transactions promptly with this system will be the knowledge that analytical programs will determine tardiness in transaction reporting, and the desire to inform the public immediately that a trade was consummated at that price. Another advantage that use of this invention provides is the accurate determination of opening and closing price ranges in hectic markets.

Although not related specifically to the present invention, one patent which is of interest to note as a background to the present invention is U.S. Pat. No. 4,674,044 which issued to L Kalmus et al. This patent reveals data processing based apparatus which makes automated trading markets for one or more securities. The system retrieves the best obtaining bid and asked prices from a remote data base, and covers the ensemble of institutions and the like, making a market for the relevant securities. Data characterizing each securities buy/sell order requested by a customer is supplied to the system. The order is qualified for execution by comparing its specifics against predetermined stored parameters. The stored parameters include the operative bid and asked prices, the amount of stock available for customer purchase or sale, and a maximum single order size. When qualified, the order is executed and the appropriate parameters are updated. The system provides inventory control and profit accounting for the market maker. The system also reports the executed trade details to the customer and to national stock price reporting systems. Upon a change in the quoted price for a security, the system updates all relevant qualification parameters. As will be shown hereinafter, this system does not relate to portable transaction station arrangements of the type to be disclosed hereinunder, nor does it relate to a computer system embodying the various features of the present invention.

Another patent which provides some of the background for the present invention is U.S. Pat. No. 3,956,615 which issued to T. Anderson et al. This patent reveals a transaction execution system including a host data processing system having a multiple account data base and a plurality of transaction terminals in communication with the host. The terminals each include a keyboard, a display, document handling subsystems, a hardware control subsystem, a communication subsystem and a programmable control subsystem supervising the other subsystems. A user initiates a transaction request by inserting a card into one of the terminals. After reading acceptable account identification information from the card, the terminal requests entry of a pre-assigned personal identification number through the keyboard. The host makes a verification with the identification number received from the terminal.

Still another patent providing some of the background for the present invention is U.S. Pat. No. 4,484,304 which issued to R. Anderson et al. This patent shows a transaction execution system in which key initiated transaction requests at a terminal remote from, but in communication with a host data processing system, is processed under the control of the host. Each transaction key at the terminal keyboard is assigned one of three different states by a financial institution table. Transactions requested by keys having a data entry state are handled within the terminal and with the additional consumer entered data required to complete the transaction being requested by and received by the terminal using sets of messages previously stored in the terminal by the host data processing system. Transactions designated by an interactive key state take place within, and involve, interactive communication between the terminal and the host, enabling the responses and other communications generated by the host in connection with a transaction for a particular customer to be customized. Message storage within the terminal and communication of messages to the terminal from the host are simplified by storage of segments of messages at the terminal.

As will be seen, the patents mentioned above do not anticipate the general objects and features of the present invention, especially as regards the application of uniquely designed, portable stations and the cooperation thereof with a central computer or host station.

SUMMARY OF INVENTION

It is an object of the invention to provide improved systems and methods for processing transactions between opposing traders.

It is another object of the invention to provide improved systems and methods involving the use of portable transaction stations and software appropriate to permit improved and more cost effective entry of transactional data at commodity exchanges and the like.

It is still another object of the invention to provide for the improved automatic reporting by traders of commodity trades, including volume as well as prices to quotation vendors, and to provide for automatic and immediate reconciliation and error reporting for traders and Futures Commission Merchants.

Still another object of the invention is to provide for automatic computation within portable transactions stations of net position, average cost, realized profit/loss, unrealized profit/loss and total profit/loss for all positions, and furthermore to provide for real time trading analyses for regulatory authorities via a central computer arrangement.

Yet another object of the invention is to provide for the automatic time stamping of transactions with the synchronization of time in all related portable transaction stations via the central computer or host, as well as to provide for coincident print-out of transactions, positions, average cost, and profit/loss in the portable transaction stations of the invention with print functions being usable selectively.

Another object of the invention relates to the provision of simplified data entry requiring fewest key strokes via the use of special function keys, such as clear last digit, handle up, handle down, tick up, tick down and separate tick keys, and to provide for a novel logic which is built in to eliminate wasteful user key strokes.

Still other objects of the invention relate to the provision of controls to alter scrolling speed and function keys to bring up various menus, as well as the provision of logical storage of all transactions.

A further object of the invention is to provide for improved functions to negate automatically a transaction (do an equal but opposite transaction) and to void a transaction (change quantity to zero and contra to blank).

Still further objects of the invention relate to improvement of the ability to maintain and update in the portable stations, a table of symbols along with various factors that pertain to the computation of profit or loss, given prices and number of contracts, to provide for the addition of a transaction number at the entry within the portable stations, and further to provide for bid and asked keys to permit reporting quotes as well as trades.

According to a feature of the invention, as will be shown hereinbelow, it is an object to provide two or more display screens on each portable station using the back side as well as the front for displaying transactions, net position data, help messages, news items and analytical or graphical data.

Still other objects of the invention include providing enter keys on two sides as well as on the face of the portable station casing so that the key can be depressed with fingers on the hand that is holding the portable station, and moreover to provide portable stations without transceivers to function as local trading tools for traders.

Among other features of the invention are ones to provide on/off switches that are recessed or covered to prevent accidental operation thereof, as well as to provide detachable printer modules on the various stations for ease of repair and replacement.

Still other features of the invention relate to the provision of keys that light up to indicate which are appropriate answers to menu questions and to provide built-in probes, also known as keypunches, to help traders hit keys with greater accuracy, as well as to provide removable, adjustable wrist straps to help prevent traders from accidentally dropping the portable stations.

As will be shown hereinafter, the invention also provides for the programmability of the stations to facilitate the updating and maintenance of the portable stations.

In providing the above and other objects of the invention, there is generally provided a system for processing transactions between opposing traders, said system comprising a plurality of portable transaction stations for converting manually entered data relating to the transactions into first transmissible signals and transmitting these first signals, and for receiving transmissible second signals and converting the same into visually perceptible displays. As will be shown, there is also included within the system of the invention a central computer, or host, for receiving and processing the first signals and for transmitting the second signals which are received by the portable stations. The host includes processing arrangements for reconciling the first signals representing data entered by traders with first signals representing data entered by contra traders, and for determining correspondence between the data entered by the traders with the data entered by contra traders. The host further includes an arrangement for transmitting second signals relating to the correspondence to the portable transaction stations.

As will be shown in greater detail hereinbelow, the system of the invention may be further adapted for reporting at least part of the data to quote vendors. To this end, the host includes an arrangement for transmitting data relating to the transactions to these quote vendors. The portable transaction stations and host preferably include radio transmission and reception arrangements to transmit and receive the aforenoted signals. Moreover, the portable transaction stations include arrangements for detachable connection to all traders as noted hereinabove and as will be shown in greater detail hereinbelow.

The portable transaction stations of the invention are each fabricated preferably in the form of portable casings with key arrangements being provided on the casings for the manual entry of data relating to transactions and activating arrangements for selectively activating the related portable transaction stations. The activating arrangement of the invention is recessed to prevent accidental activating and deactivating of the portable stations, and the key arrangements include various features as will next be noted generally below.

In accordance with the invention, the key arrangements include bid and asked keys for reporting quotes in addition to transactions, and furthermore include arrangements for entering data relating to identification of the enterer of the data, identity of the item which is the subject of the transaction, whether the transaction is buy or sell, and volume, price, time, date, FCM identity, contra, transaction number and whether the transaction was done as principal or agent.

As will also appear in greater detail hereinbelow, the invention provides for respective transaction display screens for displaying visually perceptible data relating to transactions, and respective position display screens for displaying visually perceptible data relating to positions. The casings of the portable stations each preferably have fronts and backs with the screens for each of the casings being respectively located on the front and back thereof.

The portable transaction stations of the invention are, moreover, adapted to work according to selection of a plurality of menus, the portable transaction stations including menus storage devices and devices for selectively calling up the menus from the storage devices.

A feature of the invention involves providing the casings with opposite sides with data entry control keys being located on the fronts and sides of the portable transaction stations. These stations are, moreover, preferably provided with programmable arrangements for the updating of the stations. The keys of the stations, moreover, are provided with arrangements for controlling scrolling speed. They also include clear last-digit keys, handle-up and handle-down keys, and tick-up and tick-down keys. Keys are also provided for the entry of transaction numbers, although this can be effected automatically and in sequence. The key arrangement also provides for a subsystem for automatically negating a transaction and for automatically voiding a transaction, there also being provided an arrangement for the printing out of transactions, positions, average cost and profits/losses. Moreover, the arrangement includes provision for the automatic time stamping (i.e., assigning of an actual time and date) for the various transactions.

In addition to the foregoing, the portable transaction stations include arrangements for the computation of net position, average cost, realized profit/loss, unrealized profit/loss, and total profit/loss for all positions.

As will be noted from the description which follows hereinbelow, the host of the invention includes a security arrangement for preventing the unauthorized use of any of the portable transaction stations. The host also includes a communication control for identifying which portable transaction station is sending data and to which portable transaction station the host should transmit responses. The host, moreover, includes a storage for storing all trades, reconciled trades and unreconciled trades.

In accordance with other features of the invention, there are provided means for the storage and continual monitoring of trader accounts, means for the analysis of unusual trading patterns, means for the generating of graphical analyses of stored data, and means for the broadcasting of news items.

In addition to a system, the invention also relates to a method and, in accordance with the invention, the method relates to the buying and selling of items having variable buying and selling prices. This method of the invention comprises traders agreeing to prices on items, with the traders converting the agreed prices and other related information into signals which each trader that is party to a transaction transmits to a common host station and the host station comparing these signals and, according to the comparison, recording reconciled and unreconciled transactions. The invention furthermore contemplates that signals indicating unreconciled transactions ar transmitted by the host station to the opposing traders with the opposing traders transmitting correction signals to the common host station to convert unreconciled transactions to reconciled transactions.

According to a further feature of the invention, the unreconcilable transaction signals cause the host station to generate signals representing these transaction data and transmits these signals to quote vendors. According to another feature, the traders can also transmit bid and asked signals to the host station, which are also transmitted by the host station to these quote vendors.

Another feature of the invention as relates to the method involves that the host station generates signals representing graphic displays of the various market trends, which are transmitted to the traders upon request.

Still another feature involves that the host station generates signals representing news items related to trading which are transmitted to the traders.

In further accordance with the invention, the host system may generate signals for the time marking of signals received from the traders and transmits to a regulatory station time marking differentials exceeding an acceptable level.

In still further accordance with the invention, the host system generates signals representing greater than an acceptable level of volatility in prices of the items and transmits the same to the aforementioned regulatory station.

Another feature of the invention relates to providing the traders with portable transaction stations for the entry of data which is visually displayed and converted into signals for transmission to the host station. Data may be entered into the portable transaction stations in the form of information including identifying the item traded, whether the item is bought or sold, price and volume. This may, in accordance with the invention, be converted into net position, average cost, realized profit/loss, unrealized profit/loss and total profit/loss information.

Still further features of the invention relate to the incrementing of the prices by tick values and/or by handle values. The signals received from the host station may be printed or may be displayed in visually perceptible form on a display screen. Provision may also be made for scrolling data available from the host station and the portable transaction stations. A transaction number may automatically be associated with each transaction at the portable transaction stations in accordance with the method of the invention.

Still further features relate to the entry of bid and asked data into the portable transaction stations in addition to agreed prices, as has been generally indicated above. Moreover, according to a supplemental feature of the invention, provision may be made for strapping the portable transaction stations to the wrists of the traders.

Other objects, advantages and features of the invention as well as the details and objects of the methods thereof will be found in the detailed description which follows hereinbelow, as illustrated in the accompanying drawing.

BRIEF DESCRIPTION OF DRAWING

In the drawing:

FIG. 3b is a rear perspective view in diagrammatic form of the portable station of FIG. 3a;

FIG. 3c is a fragmentary view along line 3c—3c of FIG. 3a;

DETAILED DESCRIPTION

Figure 1:
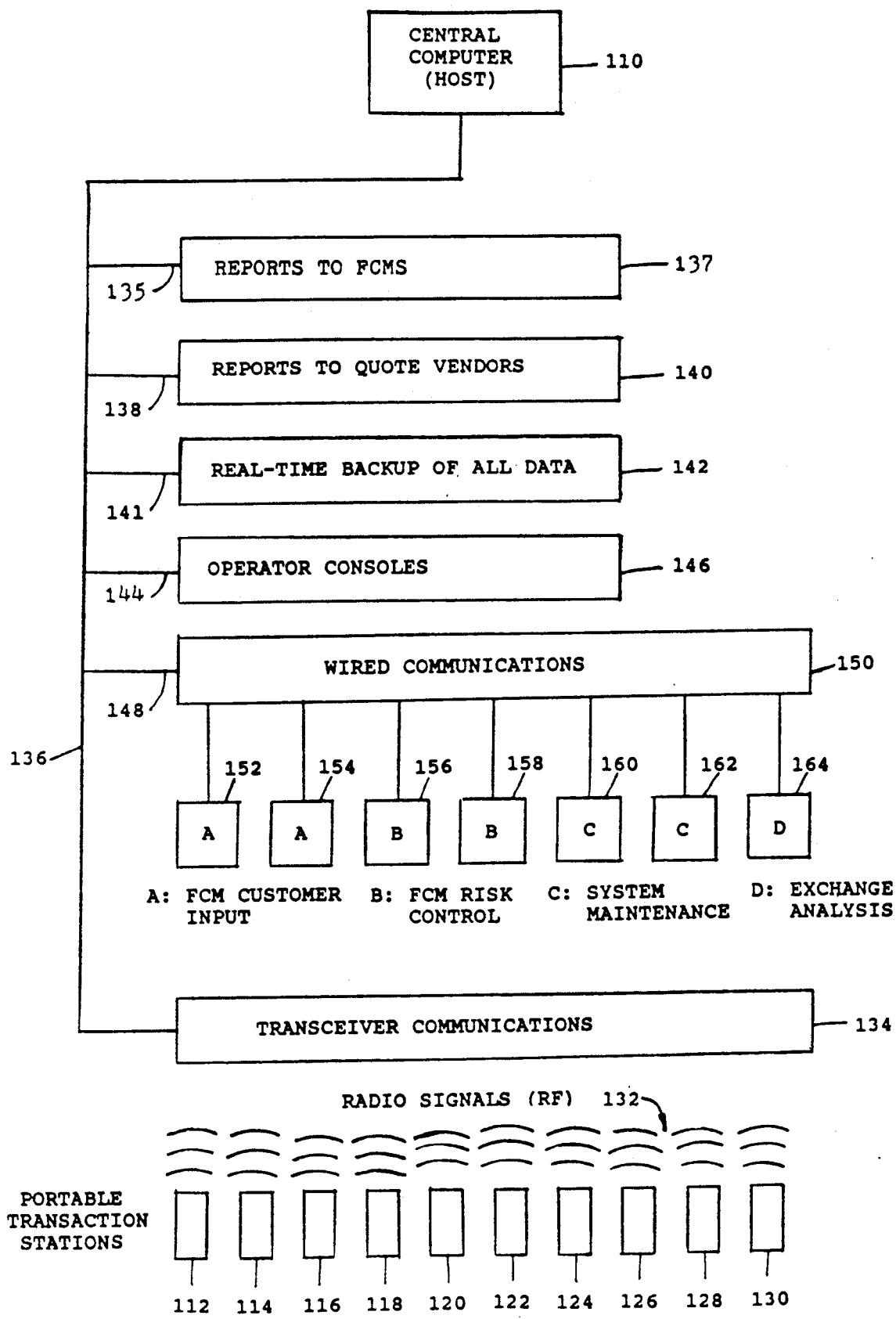
FIG. 1 is a general block diagram illustrating a system provided in accordance with the invention, inclusive of portable transactions stations and a central computer or host.

To facilitate comprehension of the description which follows hereinbelow, various terms which may be employed are set forth in the following table:

| Term | Definition of Terms<br>Definition |
|---|---|
| Agent: | A trader who executes a trade for an unrelated account and earns a commission for the service. |
| Alpha: | The descriptor used by each trader to identify himself for the purpose of reconciling trades. |
| Call: | An option that gives the holder the right to buy the underlying commodity at the strike price. The option has a specific life after which it expires and becomes worthless. |
| Clearing Trades: | The process of holding accouqts of traders and providing reconciliation and monetary guarantees to the Commodity Clearing Corporation. |
| Commodity Clearing Corporation: | The organization that stands between all traders by guaranteeing that it will buy from all sellers and sell to all buyers. The CCC looks to the FCMs to make good when any trader defaults. |
| Contra: | The opposing party in a transaction. The contra alpha is the descriptor used by the contra to identify himself. |
| FCM: | The Futures Commission Merchant is the firm that clears traders' transactions. |
| Net Position: | The sum of all transaction quantities in each distinct commodity contract where buys are counted as plus and sells are counted as minus. |
| P/L: | Profit and Loss, discussed in three ways: |
| Realized | - P/L from trades that are closed (buys = sells). |
| Unrealized | - P/L computed from the difference between the current market price and the original transaction price. |
| Total | - The sum of realized and unrealized P/L. |
| Pricing Terms: | Price - Buyers pay and sellers receive this amount.<br>Bid - The price a buyer states he is willing to pay.<br>Ask - The price a seller states he is willing to accept.<br>Quote - Indications of the bid and ask prices.<br>Handle - A price change of one integer point; e.g., 138.00 to 139.00.<br>Tick - The minimum price change allowed for a commodity; e.g., 138.00 to 138.05. |
| Principal: | A trader who trades for his own account. |
| Put: | An option that gives the holder the right to sell the underlying commodity at the strike price (see below). The option has a specific life, after which it expires and becomes worthless. |
| Quote Vendor: | A company that collects pricing data for commodity and security transactions and resells it to subscribers; e.g., Quotron, Telerate. |
| Real time: | Concurrent with actual trading. |
| Reconciliation: | The process of comparing trades executed by all traders to uncover mismatches that must be fully resolved. |
| Risk: | From the viewpoint of the FCM, risk is the possibility that unexpected market movements could cause clearing accounts to suffer losses beyond their ability to pay, thus leaving the FCM with the obligations. Such losses arise out of both market price fluctuations and also because traders usually take on larger |

-continued

| Term | Definition of Terms<br>Definition |
|---|---|
| | intraday positions than they would carry overnight. Thus, when an FCM measures its risk of loss each evening, it does so without the benefit of knowing how large the positions are that its traders will take during the next trading session. |
| Risk Control: | For the FCM, risk control is the ability to prevent catastrophic losses that could endanger its solvency. |
| Short sale: | The sale of a commodity contract or security before it is purchased. |
| Strike Price: | The exercise price of an option. |
| Symbol: | The alphabetic descriptor given to commodities; e.g., YX indicates the New York Futures Exchange (NYFE) stock index futures contract; YXH indicates the NYFE stock index futures contract that expires in March. |
| Transaction Number | Sequential number that is used to label a transaction for ease of control. These numbers are automatically assigned by the system. |

In addition to the above, various abbreviations will be employed in the following text. Some of these abbreviations are shown in the table which follows hereinbelow.

| | Abbreviations |
|---|---|
| PTS - | portable transaction station |
| TDS - | transaction display screen |
| PDS - | position display screen |
| GDS - | graphics display screen |
| HC - | host computer (central computer) |
| CCC - | Commodity Clearing Corporation |
| CFTC - | Commodity Futures Trading Commission |
| FCM - | Futures Commission Merchant |
| T# - | transaction number (sequential number) |
| RF - | radio frequency |
| RAM - | random access memory |
| ROM - | read only memory |

The system of the invention includes, for example, a central computer equipped with communications hardware with built-in transceivers that can accept radio type signals (or other types of signals such as optical signals), a plurality of portable transaction stations each equipped with a similar transceiver, FCM customer terminals, FCM risk control terminals, operator consoles, and terminals that serve for system maintenance and exchange trading analysis. Circuits and apparatus to report all data to quote vendors and for real-time backup of all data are also provided. FIG. 1 shows how the parts of the system interrelate.

The central computer may actually be several computers that function together and/or a fault-tolerant system. The central computer is equipped with communications hardware which permits radio transmission to and from portable transaction stations able to transmit radio signals as well as terminals that are either hard wired or connected via telephones and modems. The portable transaction stations include special unique functions that permit traders to enter data with a minimum number of keystrokes and then store, display, selectively retrieve, list, edit, compute, analyze, graph and print data in the most usable formats.

In FIG. 1 appears a central computer or host 110, forming an important portion of the system of the invention. Also appearing in FIG. 1 are a plurality of portable transaction stations 112, 114, 116, 118, 120, 122, 124, 126, 128 and 130. This number of portable transaction stations is exemplary only of a plurality or multitude of portable transaction stations which may be employed in accordance with the invention according to need. As will be shown hereinafter, the portable transaction stations each include transceiver sections for producing radio signals as indicated at 132, which are transmitted to a transceiver communications section 134, coupled generally by a hardwire system indicated at 136 to the central computer or host 110. The central computer or host is, moreover, hardwired or otherwise coupled as indicated at 135 to circuitry indicated at 137 which provides for reporting to FCMs. It is also coupled as indicated at 138 to circuitry indicated at 140 which provides for reporting to quote vendors. It is also coupled, as indicated at 141, to circuitry 142 which provides for a real time backup of all data. In addition, a connection is indicated at 144 to operator consoles 146 and a hard wiring connection is indicated at 148 through circuits 150 to terminals 152, 154, 156, 158, 160, 162 and 164. The number of circuits illustrated, once again, is not limitative of the invention and a greater or lesser number of terminals may be employed. These terminals are indicated as being terminals A, B, C, and D. Terminals A are FCM customer input terminals; terminals B are FCM risk control terminals; terminals C are system maintenance terminals; and terminal D is an exchange trading analysis station.

As will appear hereinafter, the system of the invention as well as the various components thereof include, without limitation, the following features:

1. An entire system including a central computer, communications hardware, portable transaction stations, and software designed to permit improved and more cost effective entry of all transactional data at commodity exchanges.

2. Automatic reporting by traders of commodity trades including volume as well as price to quotation vendors.

3. Automatic and immediate reconciliation and error reporting for traders and Futures Commission Merchants.

4. Automatic computation within the portable transaction stations of net position, average cost, realized profit/loss, unrealized profit/loss, total profit/loss for every position.

5. Real time trading analyses for regulatory authorities via central computer.

6. Automatic time stamping of transactions with the synchronization of time in all portable transaction stations via the central computer.

7. Coincident printout of transactions, positions, average cost, profit/loss in PTS. Print function is switchable on or off.

8. Simplified data entry requiring fewest keystrokes via use of special function keys; clear last digit, handle up, handle down, tick up, tick down, separate tick keys, and new logic built in to eliminate wasteful user keystrokes.

9. Controls to alter scrolling speed.

10. Function keys to bring up various menus.

11. Logical storage of every transaction.

12. Functions to automatically negate a transaction (do an equal but opposite transaction) and to void a transaction (change quantity to zero and contra to blank).

13. Ability to maintain and update in PTS a table of symbols along with various factors that pertain to the computation of profit and loss, given prices and number of contracts.

14. The automatic addition of a transaction number at entry within the PTS.

15. Bid and Ask keys to permit reporting quotes as well as trades.

16. Two or more display screens on the same PTS using the back side as well as the front for displaying transactions, net position data, help messages, news items, and analytical, graphical and tabular data.

17. Enter keys on two sides as well as face so that the key can be depressed with fingers on the hand that is holding the PTS. The Enter Keys situated on the sides include locks that permit traders to disable them as desired.

18. PTS without a transceiver to function as local trading tool for traders.

19. ON/OFF switch that is recessed and/or covered to prevent accidental shut off.

20. Detachable printer module on the PTS for ease of repair and replacement.

21. Keys that light up to indicate which are appropriate answers to menu questions.

22. Built-in keyprobe (called a "keypunch").

23. A removable, adjustable wrist strap.

24. Programmability for easy updates and maintenance of the PTS.

The following example illustrates how users interrelate with each other and with the system during normal operations. This description starts with what happens when a trader arrives at his exchange floor to begin his trading activity. In the aforegoing, traders include those who represent buyers and sellers who are not on the exchange floors.

Before beginning to trade, traders must establish communications with the host using their portable transaction stations (PTS). Simply turning on the PTS power switch causes the PTS to open a communications path with the host and to initiate logon and setup procedures. The host first requests that the trader enter his password which is matched with his alpha to insure that unauthorized use is disallowed. The password directory in the host is maintained by employees of the exchange and includes separate passwords selected for each trader by the Futures Commission Merchants (FCM) which must also be matched before trading activity is permitted.

During this procedure, the trader is informed by the PTS how much battery charge time is remaining and, should there not be enough time for the full trading day, he would then replace the battery pack with a fully charged pack and submit his discharged pack for recharging. A service desk on each exchange floor will store the units overnight and make sure that batteries are all fully recharged overnight.

Traders may now enter transactions, study positions, perform analyses, and receive graphical and tabular displays as well as news items. Prior to the opening of trading, a trader can use the system to request that the host send to his graphical display screen (GDS) one or more charts or tables which are prepared in advance by the host and stored for retrieval. Real time charts are also provided by the host, but these will be limited by the available computing resource. This type of auxiliary service is never permitted to degrade host performance in the more important tasks associated with clearance, reconciliation, risk control and regulatory control.

As the trading session begins, traders execute transactions with each other and report them to the host via their PTS. For example, if trader ABC buys 15 SPH at a price of 250.25 from trader XYZ at 8:35:18 AM on Jan. 5, 1988, each will make the following entries which appear on their transaction display screens (TDS):

| ABC - BUY | 15 | SPH | 250.25 | XYZ |
| XYZ - SELL | 15 | SPH | 250.25 | ABC |

Figure 2:
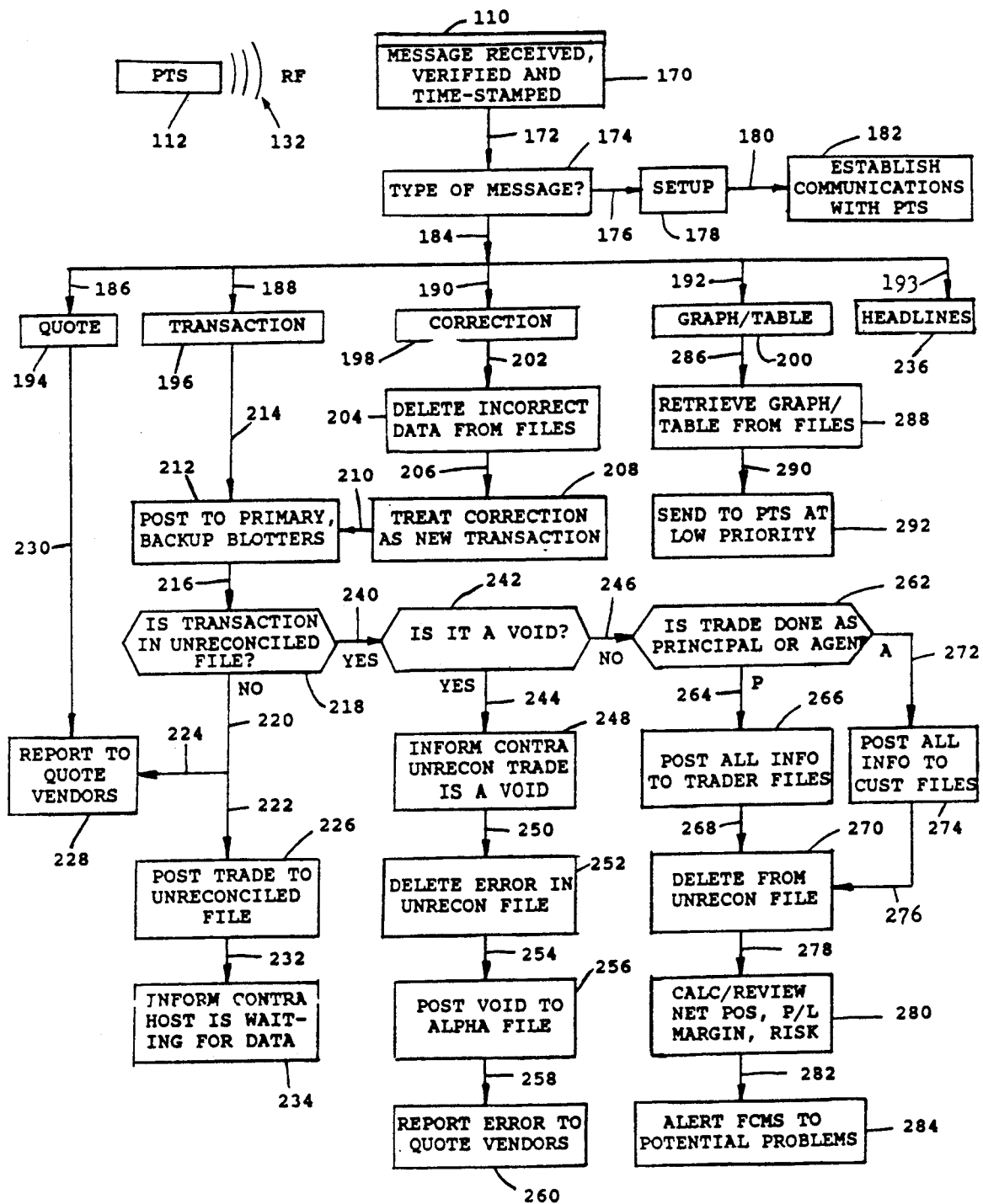
FIG. 2 is a generalized block diagram, including portions shown in the form of a flow diagram, illustrating the procedure generally initiated within the host.

When each trader depresses his ENTER key, the message is sent to the host and processed as illustrated in FIG. 2. Data is recorded in files in a random access memory (RAM) and on a disk including the time of the trade as it was time stamped (i.e., marked) by the PTS, the time received by the host, and the automatically incremented transaction number (T#) which is specific to each trader's activity for the day. When the host receives the first message and determines that it is a transaction, it first adds the message to primary and secondary (back up) blotters. Then it checks the unreconciled file for a matching trade and, upon not finding it, posts the message to the file of unreconciled trades. Since the vast majority of trades are correctly reported, the host will assume that this trade will reconcile, and for the benefit of disclosing to the public as quickly as possible sends the data to the quote vendors. When the transaction message from the other trader arrives, the host posts it to the blotter files, checks the file of unreconciled trades and, upon finding it there, deletes it, and then adds each transaction record to each trader's files with the time of reconciliation. This will provide analysts with data required to measure traders' reporting performance.

Throughout the data entry process, the host communications system notifies each PTS via special indicators that messages are being correctly received and sent. This is intended mostly to keep the trader's confidence in the system so that he doesn't have to wonder whether the host has received his messages as he sent them. As soon as the trade data arrives at the host and is not immediately reconciled, the T# is returned to the PTS of origin as an unreconciled trade. Another message is sent to the PTS confirming the reconciliation when it occurs. These messages are directed to the position display screen (PDS) so as not to interfere with entries that may be taking place on the TDS.

In the event that a mismatch occurs both traders will know immediately which trade has the error because the host has notified them of their unreconciled T#. The PTS menu key, RCN, can then be used to display all the data for the transaction (also readable from the printed list), and when the two traders resolve their conflict, each one—or only the one in error—can use the CRCT key to inform the host of the proper trade data. Upon receiving that data, the host will recheck the file of unreconciled trades, adjust for the correction and so inform both PTS's.

With regard to customer trades (trades executed by a trader as agent for the account of someone else), the host will maintain a separate file of such transactions and keep a running dialog with FCM personnel who will be asked to enter through wired terminals the customer account number associated with each such trade. The host can then submit electronically all transaction data to the individual FCM computers so that all additional keypunching and its inevitable introduction of some errors can be avoided.

The host has other supervisory functions to perform as the trading session progresses. Currently, each FCM clears all trades through its computer system after the close of trading, but an improvement to this process that should be considered is to have the host maintain net position data for all floor traders so that real time profit/loss, margin, and risk analyses can be performed and sent to authorized FCM risk control managers who can request that traders who are at risk above their within a fixed amount of time, or no later than the end of the trading session. It is anticipated that this suggestion will be an important advancement in the manner in which futures exchanges and their FCMs manage their risks, and that the host in the present invention will be programmed to perform the required computation. Programming of this kind is not unique to any individual or firm and is widely available in the industry. However, the concept of performing such analyses in real time (concurrent with trading) is not known and could not be fully implemented without the coincident use of some device like the PTS.

Another host function will be to keep exchange officials aware of potential problems that arise with floor traders so that FCM reactions can be monitored. When a set of guidelines are created, this system will permit measuring how well they are being followed and how they can be improved to provide a better market for everyone. Additionally, but along the same lines, programs can be installed in the host to provide the CFTC with analyses that are specific to its needs. This invention does not attempt to anticipate all of the concerns of either the commodity exchanges or the CFTC, but it will provide the means to answer many questions in the process of improving the commodity markets for everyone.

Referring next more particularly to FIG. 2, there is shown by way of example one of the portable transaction stations of FIG. 1, such as, for instance, station 112 which transmits the radio signals indicated at 134 to the host 110. In FIG. 2 appears block 170 indicating that the host receives the message from the portable transaction station, verifies and time stamps, or time marks, the same. Line 172 is a flow line leading to block 174 whereat a check is made as to what kind of message has been received. Line 176 leads to block 178 which indicates setup, which indicates by line 180 that a communication is established with the portable transaction station as indicated by block 182. Line 184 leading from block 174, subdivides into lines 186, 188, 190, 192 and 193, leading to blocks 194, 196, 198 and 200 respectively. Block 194 is a quote situation, whereas block 196 is a transaction situation. Block 198 is a correction situation and block 200 relates to graphs and tables or, in other words, to information which is expressed graphically or in tabular form. Flow line 202 leads from correction block 198 to phase 204, which indicates that if there is a correction to be made, the incorrect data is deleted from all files and this leads via line 206 to block 208, which indicates that the correction is treated as a new transaction. The new transaction, as indicated by flow line 210, leads to block 212 which indicates that a posting is made to the primary and backup blotters. This block 212 is also receiving indications from transaction block 196 via line 214. These regular transactions are also posted to the primary and backup blotters as indicated by block 212. From this position, flow line 216 leads to block 218 whereat a query is made as to whether the transaction is one which is in an unreconciled file. If the answer is no, the flow line proceeds at 220 and subdivisions 222 and 224 to blocks 226 and 228. Block 226 indicates a posting of the transaction to the unreconciled file and 224 indicates a report to the quote vendors at 228. Also connected to block 228 is the quote block 194 via line 230, so that quotes which are received are also posted or reported to the quote vendors. Line 232 leads to block 234 indicating that the contra should be informed that the host is waiting for an entry for purposes of reconciliation.

Referring again to block 218, as to the question as to whether the transaction is in the unreconciled file, there is a yes indicated on line 240, there is asked at block 242 whether the transaction is a void. If the answer is yes, as indicated on line 244, the procedure leads to block 248. If the answer is no, the procedure advances along line 246. At block 248, the contra is informed that the unreconciled trade is a void and the procedure continues via line 250 to block 252 indicating that the error should be deleted in the unreconciled file. Thereafter the procedure continues along flow line 254 to block 256 indicating that the void is to be posted to the appropriate alpha file. The procedure then continues along flow line 258 to block 260 which provides for reporting the void to the quote vendors.

Returning now to line 246, this leads to block 262 whereat inquiry is made as to whether the trade is effected by a principal or an agent. If the trade or transaction is effected by a principal, the procedure advances along line 264 to block 266 to provide for posting to both trader's files with all information. The procedure continues thereafter along flow line 268 to block 270 to provide for deleting from the unreconciled file.

If the answer at block 262 indicates that an agent has effected the transaction, flow line 272 leads to block 274 which requires posting to the customer's file with all information particular to that transaction. Flow line 276 leads thereafter to deleting from the unreconciled file at block 270.

The procedure advances along flow line 278 to block 280 to provide for calculating and reviewing net position, profit/loss, margin and risk. The procedure then advances along line 282 to block 284 to provide for alerting FCMs to potential problems.

Reverting to block 200, the procedure advances from that point via flow line 286 to block 288 to provide for retrieving information in graphic or tabular form from the appropriate file. Flow line 290 leads to block 292 indicating that the graphic or tabular information can be sent to the requesting portable transaction station at low priority.

Block 236 indicates a source of news items which are sent to all portable transaction stations at low priority when signals requesting other specific tasks such as transaction processing or retrieval of graphs or tables are not received by the host at 110. Line 193 indicates a path of information flow.

Figure 3A:
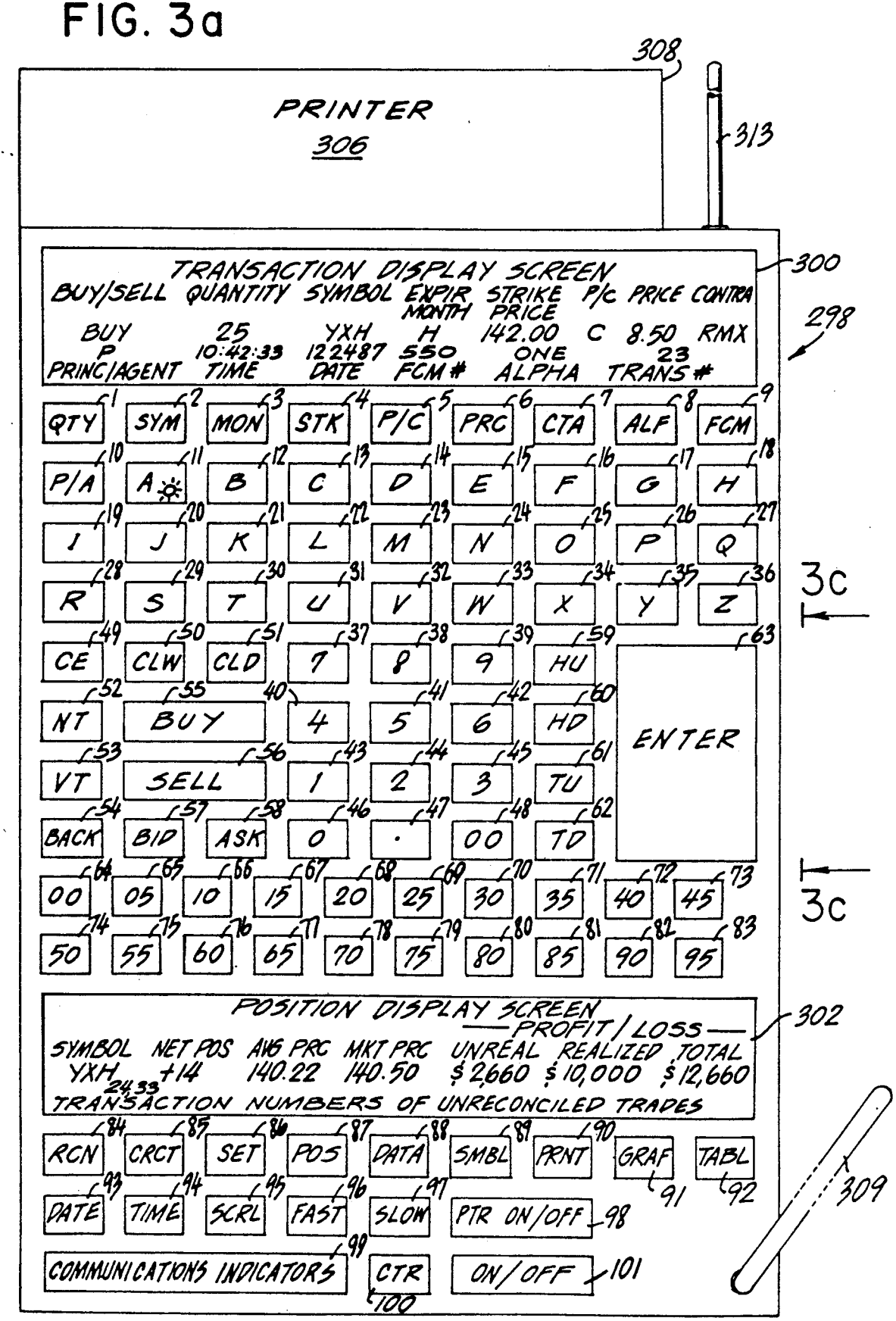
FIG. 3a is a partly diagrammatic, partly schematic view of the front and right side edge, or side, of a portable transaction station provided in accordance with the invention.
Figure 3B:
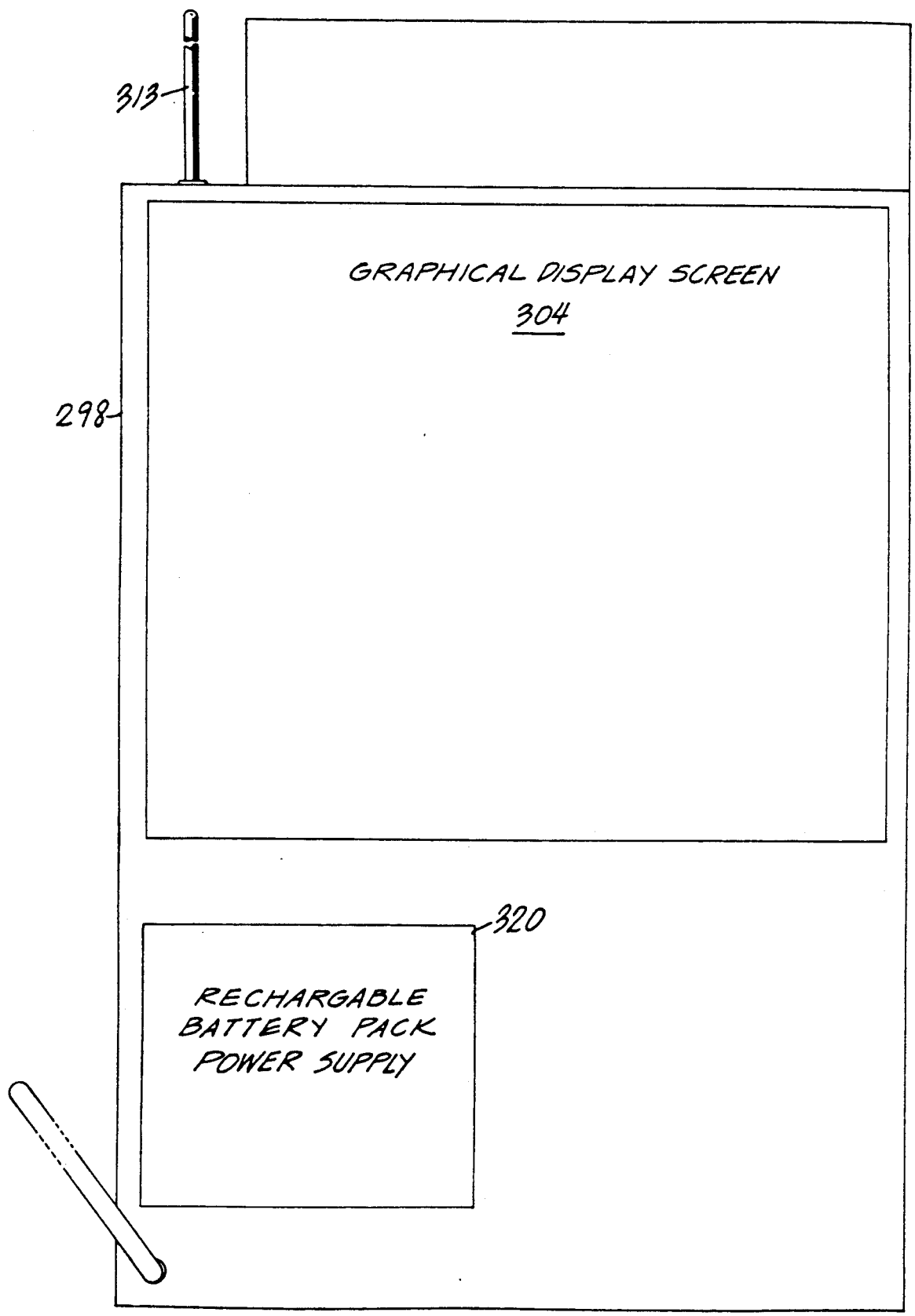
Figure 3C:
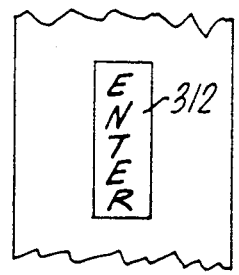

A portable transaction station (PTS) 298 illustrated in FIGS. 3(a) and 3(b) is a uniquely designed device that provides traders with the means to enter, store, display, selectively retrieve, list, edit, compute, analyze, graph and print transaction data and communicate with the central computer (host). Features of the PTS include two display screens 300 and 302 on the front used for transactions and net positions plus reconciliations respectively, and one display screen 304 (FIG. 3(b)) on the reverse side used for graphical and tabular analysis and news items, a modular printer 306 that unplugs and detaches from the PTS body or casing 308, a recessed power on/off switch to protect against accidental switch off, and a separate probe (not shown) used as a keypunching aid is housed within the PTS body which has an adjustable and removable wrist strap 309 attached. "ENTER" keys 63, 312, etc. are provided on both sides (see FIG. 3c) as well as the front to allow faster keystroking via the use of both hands regardless of which hand is holding the PTS. An antenna 313 provides for radio signal transmission.

A complete set of keys or switches 1-101 is provided including recessed off/on switch 101 referred to above. Also included, as noted below, are a complete set of field keys which direct the succeeding entries to any desired field, special pricing keys to minimize required keystrokes, function keys which perform specific functions and menu keys which provide choices among various alternatives. Also included is a transceiver system for communication with the host, communications indicators on the front panel to inform users that data is being transferred correctly, and an indicator to show how much charge time remains before the batteries need recharging.

The PTS is programmable via magnetic cards or an equivalent method in order to simplify and lower costs of maintenance as well as upgrading of its capabilities. The following table indicates the purpose and/or function of keys or switches 1-101.

| Portable Transaction Station Keyboard Functions | | | |
|---|---|---|---|
| Key | Key No. | Indicator Meaning | Purpose of Key |
| QTY | 1 | Quantity | number of contracts |
| SYM | 2 | Symbol | issue designation |
| MON | 3 | Month | expiration month |
| STK | 4 | Strike Price | option exercise price |
| P/C | 5 | Put/Call | type of option |
| PRC | 6 | Price | transaction price |
| CTA | 7 | Contra Party Designation | letters designating identity of opposing party |
| ALF | 8 | Alpha Designation | letters designating trader's identity |
| FCM | 9 | Futures Commission Merchant Number | number designating FCM |
| P/A | 10 | Principal or Agent | is trade for trader or customer |
| A-Z | 11-36 | Letters of Alphabet | various uses |
| CE | 49 | Clear Entry | blank out TDS |
| CLW | 50 | Clear Last Word | blank last word (Field) |
| CLD | 51 | Clear Last Digit | blank last digit |
| NT | 52 | Negate Transaction | do equal and opposite transaction |
| VT | 53 | Void Transaction | cancel transaction |
| BACK | 54 | Backup One Step | move back to prior step |
| BUY | 55 | Buy | buy transaction |
| SELL | 56 | Sell | sell transaction |
| BID | 57 | Bid Quote | to report bid quote |
| ASK | 58 | Ask Quote | to report ask quote |
| 0-9 | 37-48 | Numbers | numerical keypad |
| HU | 59 | Handle Up | increase handle by 1 |
| HD | 60 | Handle Down | decrease handle by 1 |
| TU | 61 | Tick Up | increase price by 1 tick |
| TD | 62 | Tick Down | decrease price by 1 tick |
| ENTER | 63 | Enter | store and send to host |
| 00-95 | 64-83 | Tick Keys | 20 keys for "05" ticks |
| RCN | 84 | Reconciliation Menu | show non-reconciliations |
| CRCT | 85 | Correction Menu | send corrections to host |
| SET | 86 | Setup Menu | logon and initialize |
| POS | 87 | Position Menu | control, retrieve position data |
| DATA | 88 | Data Menu | control transaction data |
| SMBL | 89 | Symbol Menu | control symbol data |
| PRNT | 90 | Print Toggle | easy print/noprint toggle |
| GRAF | 91 | Graph Menu | display graphs on GDS |
| TABL | 92 | Table Menu | display tables on GDS |
| DATE | 93 | Date Key | adjust date |
| TIME | 94 | Time Key | adjust time |
| SCRL | 95 | Scroll | toggle scroll/pause |
| FAST | 96 | Scroll Faster | scroll speed adjust |
| SLOW | 97 | Scroll Slower | scroll speed adjust |
| PTR ON/OFF | 98 | Printer On/Off | printer power switch |
| COM IND | 99 | Communications Indicators | verification of data transfer |
| CTR | 100 | Charge Time Remaining | warning for battery |
| ON/OFF | 101 | Power On/Off | power switch |

Transaction data may be entered in a variety of ways. Logic is designed into the keyboard of the PTS to minimize the number of keystrokes required to enter transactions. Data associated with every transaction include:

| Item | Retrieved By |
| --- | --- |
| Buy or Sell | Entered |
| Quantity | Entered |
| Symbol | Entered |
| For options . . . | |
| Put or Call | Entered |
| Strike price | Entered |
| Expiration month | Entered |
| Price | Entered |
| Contra | Entered |
| Principal or Agent | Entered |
| FCM # | File or entered |
| Alpha | File |
| Date | Internal clock |
| Time | Internal clock |
| Transaction Number | Automatic |

After the first transaction has been entered and appears on the TDS 300, a wide variety of possible entries could be required for the next transaction. Each item in the above list is shown on the TDS 300 as illustrated in FIG. 3. All keys have lights built in, around, or nearby which are illuminated when they may be used to respond correctly to the current prompt.

With reference to FIG. 3, keys numbered 1 through 10 are field keys that may be used to position the TDS cursor for the next data item to be entered. These keys insure that any ambiguity can be resolved with one keystroke. Keys 11-36 are the letters of the alphabet and keys 37-48 represent the familiar numeric keypad for data entry. Key 11 is shown as an example of all other keys that are fitted with lights to indicate which are appropriate responses to menu questions. Keys 49-51 are erasers for the entire entry, the last word or the last digit entered.

Keys 52-83, 93-97 and 100 are function keys that perform a variety of special tasks. Key 52 may be used to offset any transaction by doing an equal and opposite transaction with a new transaction number (T#). Key 53 automatically voids a transaction by informing the host that the particular T# was transmitted in error and is to be ignored. Key 54 is used in conjunction with the menu keys described below by permitting the trader to backup one command at any time. Keys 55 and 56 inform the PTS 298 that the transaction being entered is either a purchase or a sale. Keys 57 and 58 provide the means to report to the public bid or ask quotes in addition to actual trade prices and volume. Keys 59-62 offer flexibility and speed in entering prices.

The Enter key is labelled 63 and is used to accept data from the keyboard and send it to the host. Additional Enter keys are placed on each side of the PTS to permit traders to manipulate this key using a finger on the hand that is holding the PTS, either left or right. Keys 64-83 are called tick keys which permit most prices to be entered with a single keystroke. These keys can be reset automatically to suit commodities that trade in different pricing increments, and additional keys of this type can be employed if desired.

Keys 84-92 are menu keys that offer various choices to the trader. Key 84 aids in correcting a previously entered transaction that has been found to be in error and key 85 sends that correction to the host. Key 86 is a setup menu that performs a security check on the trader and initializes the system with his alpha, his primary FCM (the clearing broker used for the trades he does as principal), the date and time. The position menu key 87 gives the trader the ability to retrieve his status of net position and profit/loss (realized, unrealized with weighted average price and total) with ease and convenience. This menu also provides for entry of the risk free rate and quick volatility changes so that option positions can be valued and included in the net position and p/1 computations. Key 88 allows the trader to retrieve his transaction data in a variety of ways to provide insight to his pattern of trading and to give some assistance in searching for errors to be corrected. Key 89 provides the PTS with the information about the securities that is needed to compute accurate profit/loss numbers. This data is originally transmitted from the host to eliminate a keypunch burden for the trader, but as with all data items, means for change is provided locally in the PTS to allow the PTS to be used during host downtime (rare because of the system redundancy).

The PRNT key 90 acts as a toggle switch that will turn the printer on and off with each press when the printer power switch is turned on. When the printer power switch is turned off, then depressing key 90 will cause a message to be displayed informing the trader that the printer power switch must be turned on. Menu keys 91 and 92 provide the means for the trader to request that the host perform any standardized graphical or tabular analyses and return the results to the GDS. The array of standard graphs and tables is expandable as traders request. Keys 93 and 94 allow convenient adjustment to date and time when necessary. Key 95 acts as a toggle starting and stopping the scroll process whenever it is used, while keys 96 and 97 permit the trader to adjust the speed of the scroll to his preference. Key 98 is the power switch for the printer. Position 99 is an array of indicators that inform the trader that data transfer from host to PTS and back has taken place correctly. Key 100 includes a light which will turn on when a minimum of battery charge time is left. Then depressing key 100 causes the approximate number of minutes of remaining battery life to be displayed in the PDS. Key 101 is the main power switch and is recessed to help prevent accidental shut off. The following examples illustrate some of the logic to minimize keystrokes.

1. Transaction is repeated at a different price:
   a. If the transaction has the same handle as the prior trade, then the trader need only push the appropriate tick key to change the price on the TDS and the sequentially incremented transaction number. The transaction number is permitted to change only once before each transmission to the host computer. Alternatively, use of the decimal point key followed by the keys indicating the proper tick value also provides the proper result.
   b. If the handle of the price has also changed, the trader may use the HU (handle up) key or HD (handle down) key to properly enter the price or he may use the numeric keypad in the usual manner to enter the full price.

2. Changes in buy/sell, quantity, price, contra:

This is the most usual situation for transaction entry. To illustrate the efficient keyboard logic, it is assumed that the last transaction displayed on the TDS 300 looks as follows:

SELL 5 SPH 260.25 RMK P 11:05:22 1/05/88 550 ONE 87 The new transaction to be entered is,

BUY 10 SPH 259.75 ABC

In this situation the trader may enter the trade by pressing:

BUY 1 0 2 5 9 . 7 5 A B C ← 12 keystrokes or alternatively,

BUY 1 0 2 5 9 TICK 75 A B C ← 10 keystrokes or alternatively,

BUY 1 0  HD  TICK 75 A B C ← 8 keystrokes.

3. If the new transaction involves changes only in the quantity (from 5 to 8) and tick value (from 25 to 30) then the trader would press:

8 TICK 30 or 8  TU  ← 2 keystrokes.

4. If the new transaction involves changes to buy/-sell, quantity, symbol, price and contra (e.g., s 12 USH 86.08 XYZ), the trader would enter:

SELL 1 2 U S H 8 6 . 0 8 X Y Z ← 14 keystrokes.

FIGS. 4a-4k are flow diagrams which illustrate the logic underlying the menu keys referred to with respect to FIG. 3a. Each of these menu keys initiate a series of events.

Figure 4A:
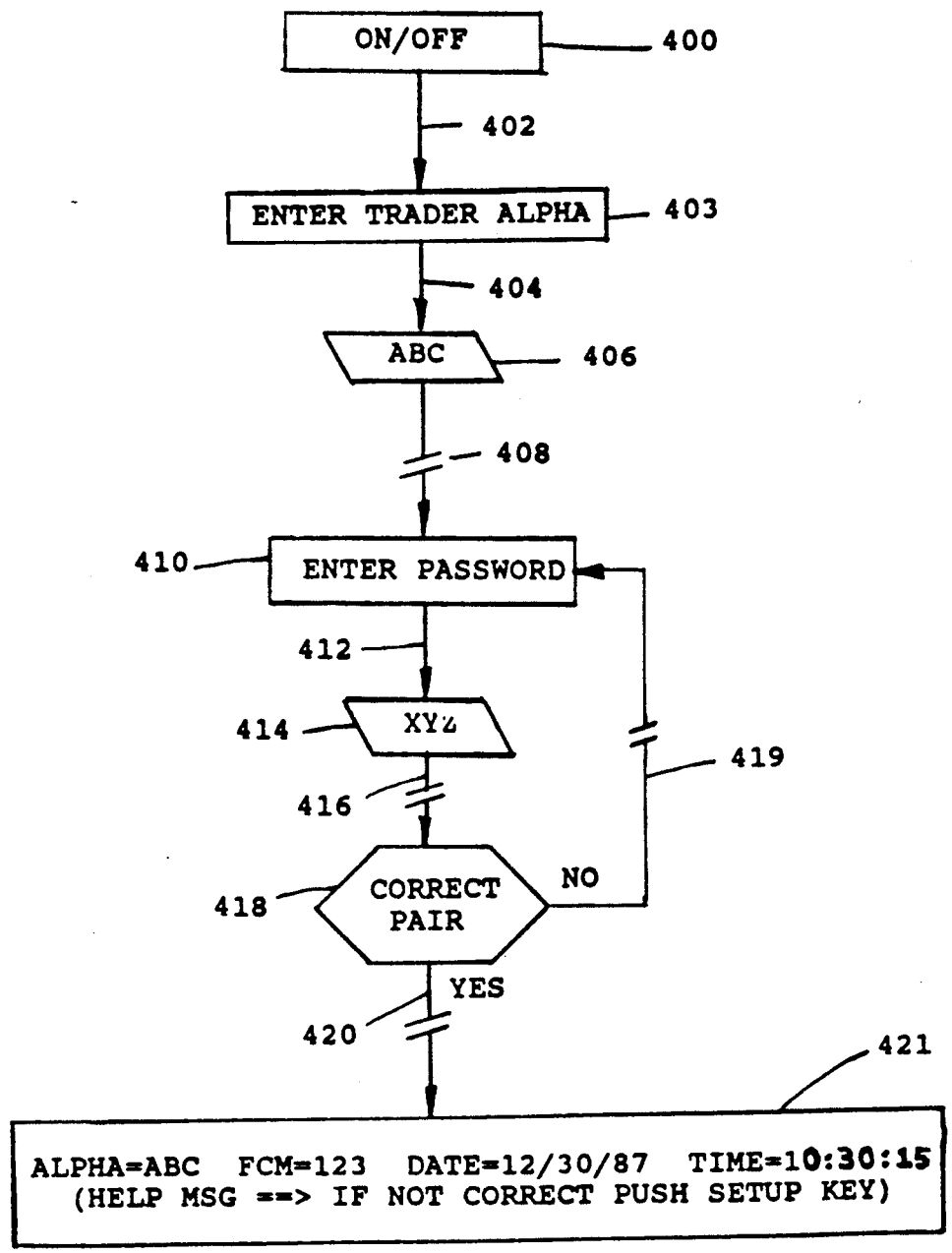
FIGS. 4a–4k show flow diagrams of different operations of the system of the invention.

Referring initially to FIG. 4a, therein is illustrated the off/on power switch logic. More particularly, block 400 illustrates the off/on operation with flow line 402 leading to block 403 which requires the entry of a trader's alpha. Flow line 404 leads to the entered trader's response (e.g. ABC), as indicated at 406. This is transmitted, as indicated at 408, into the enter password block at 410 leading via flow line 412 to the password entry (e.g. XYZ) at 414. This leads via line 416 to a determination of the correct pair at block 418. If the answer is no, line 419 leads back to the enter password block 410; if the answer is yes, the transmittal is via flow line 420 for transmission to block 421 whereat is displayed the alpha, the FCM number, the date and the time along with a help message. If there is an error, pushing of the setup key permits the trader to correct it.

Figure 4B:
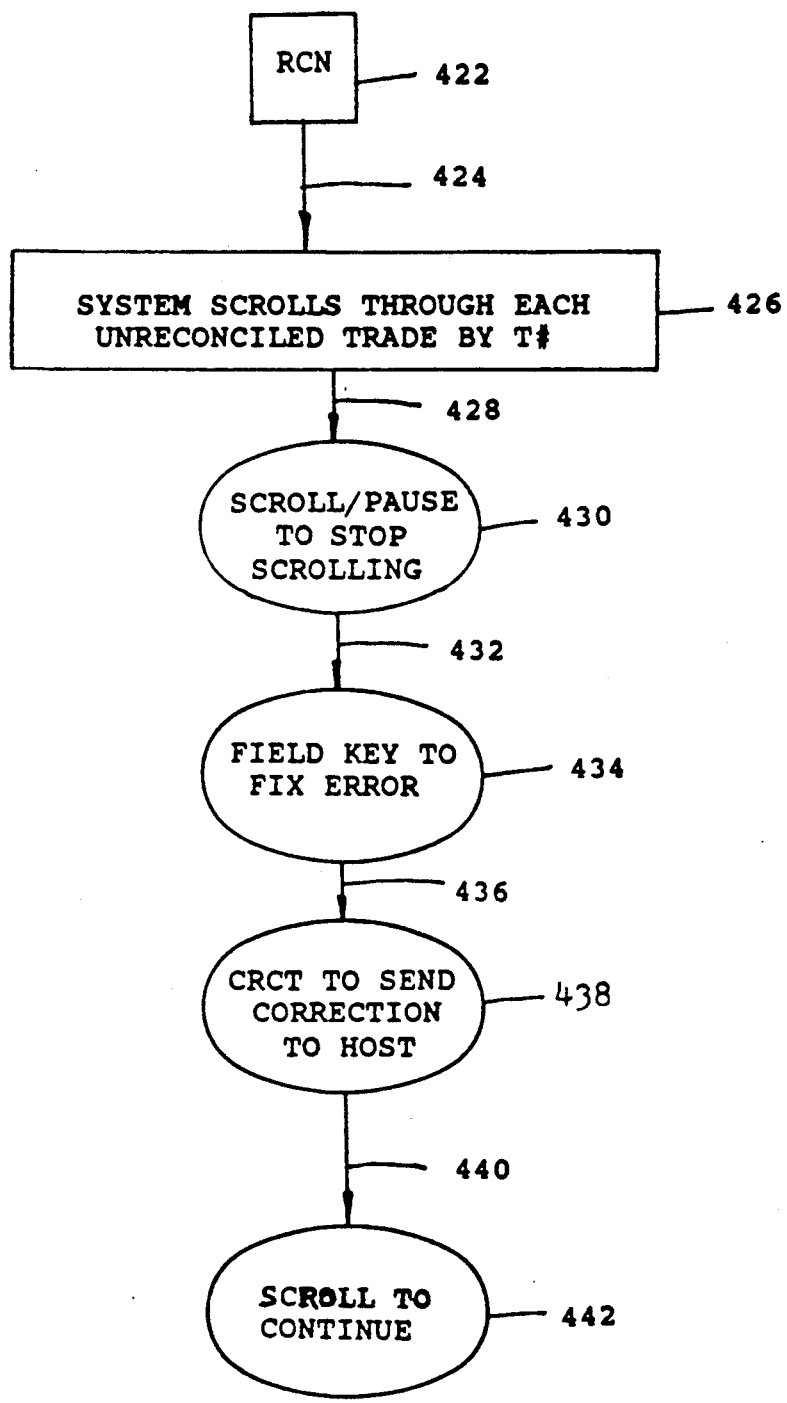

FIG. 4b deals with the reconciliation and correction keys logic. Reconciliation is indicated at 422, flow line 424 leading to block 426 whereat the system scrolls through each unreconciled trade by transaction numbers in sequence. Flow line 428 leads to an indication of scroll/pause to stop scrolling there being a continuation along line 432 to operate any field key at 434 to fix the error. Flow line 436 passes through instructions to depress the CRCT key in order to send the correction to the host, as indicated at 438, and flow line 440 advances to a scrolling operation to continue the scroll, as indicated at 442.

Figure 4C:
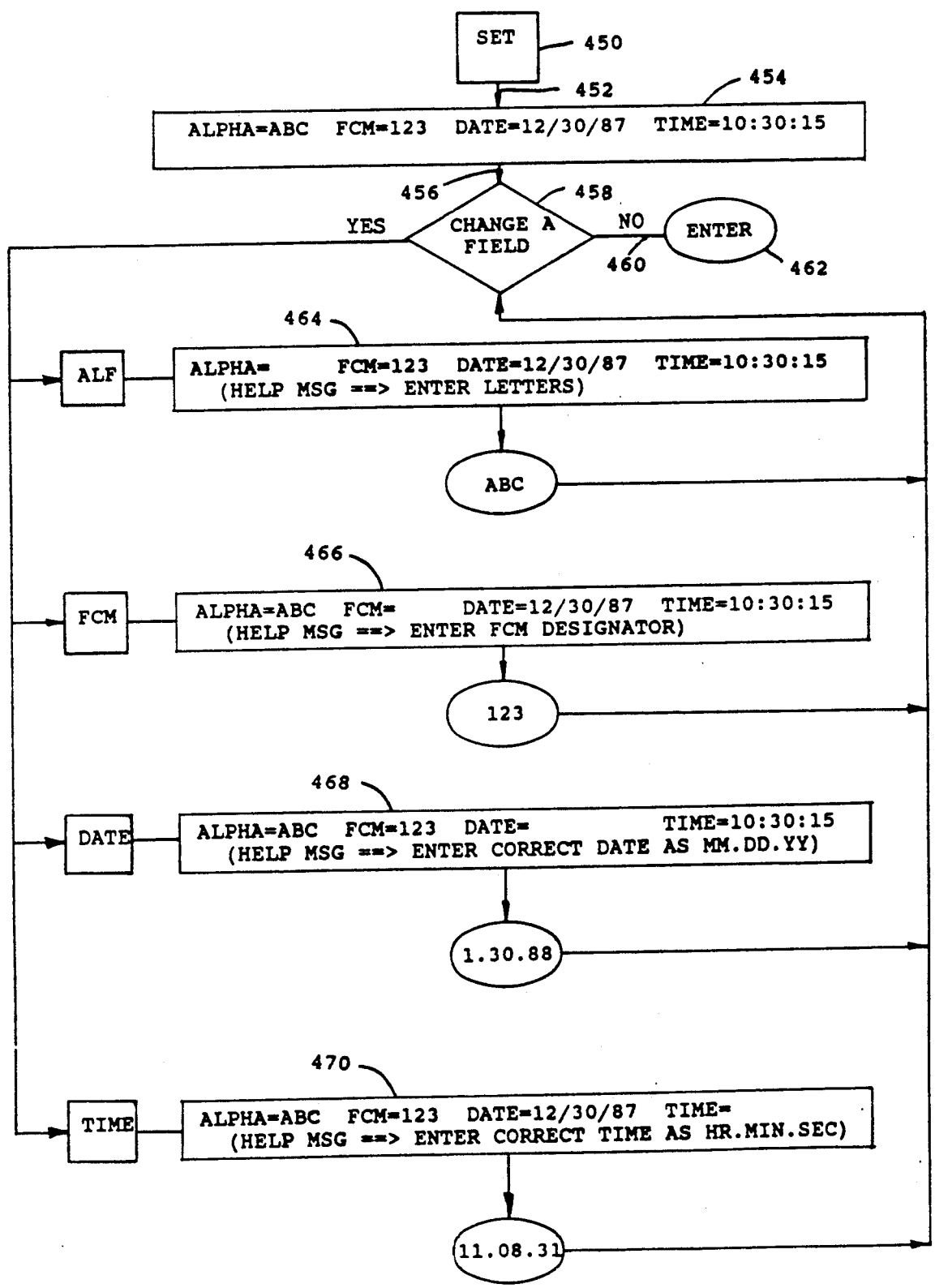

FIG. 4c deals with setup key logic, as indicated at block 450, leading through flow line 452 to block 454 whereat appears the alpha, FCM number, date and time markings. Continuation takes place, as indicated by flow line 456, to block 458 at which there is a question as to change of field. If there is no change of field, the procedure moves along flow line 460 to block 462 indicating an acceptance of the data as correct by depressing the enter key. Display and change can be effected with respect to alpha at block 464, and at block 466 with respect to FCM. The date information is alterable at 468 and the time information at 470. The date is entered in the sequence month, day, and year. The time is entered as hour, minute, and second. The date and time functions may be required only during host downtime because the host will synchronize all PTS internal clocks.

Figure 4D:
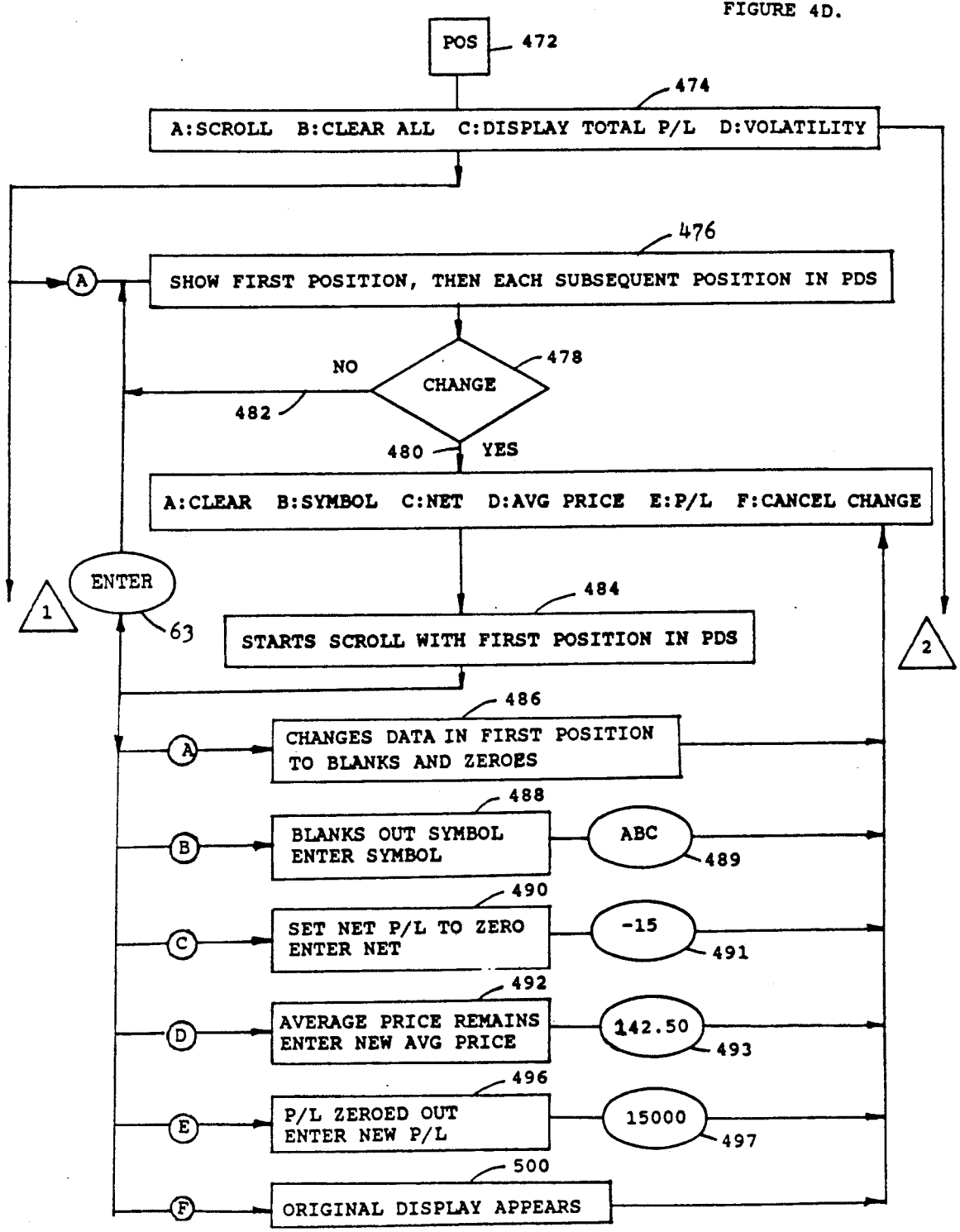
Figure 4E:
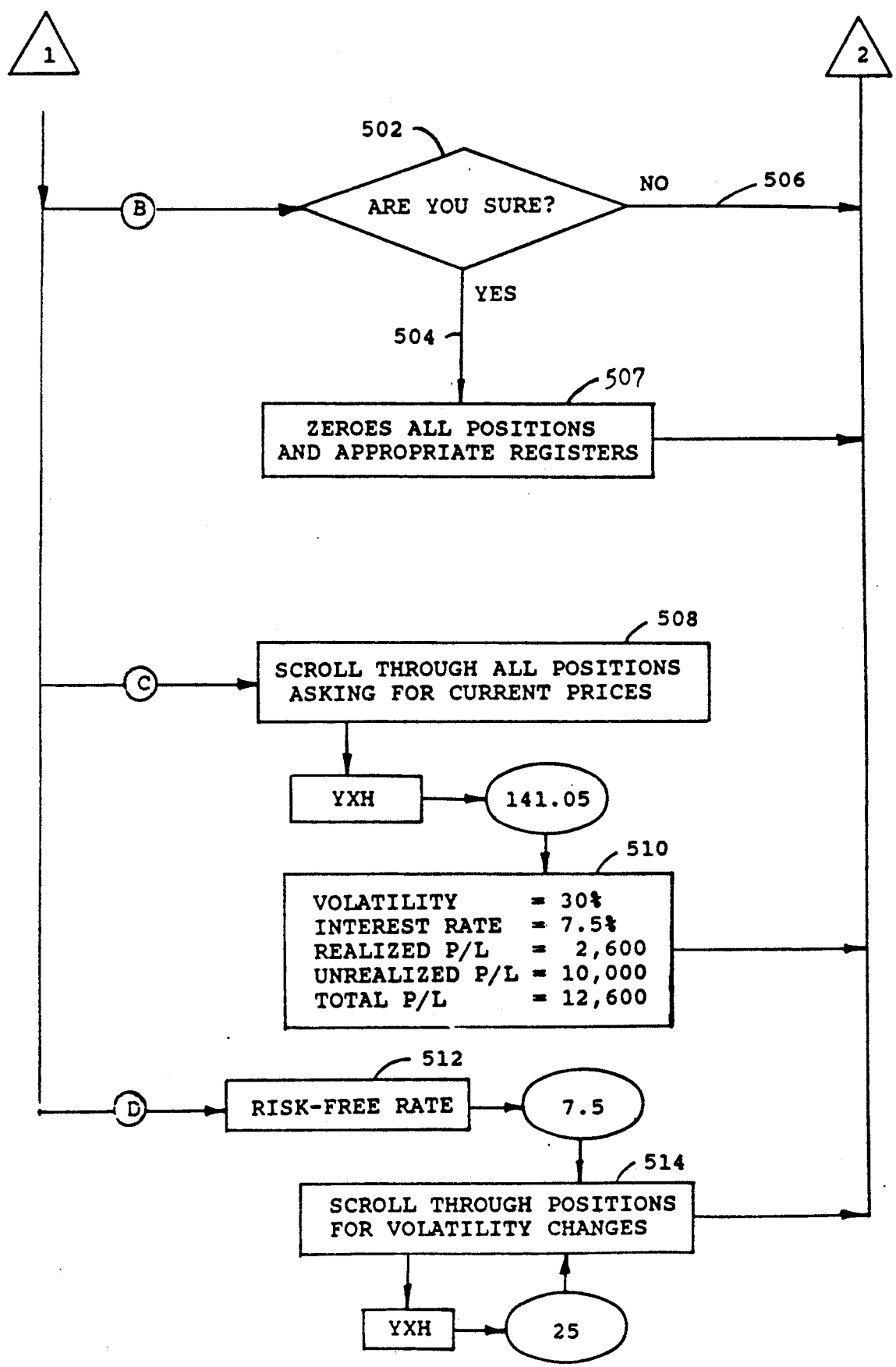

FIGS. 4d and 4e cooperatively illustrate the position key logic, FIG. 4e being a continuation of FIG. 4d, as indicated by triangles 1 and 2. The position key operation appears at 472 indicating scroll, clear all, display total, P/L and volatility as indicated at block 474. Block 476 indicates first position and then subsequent positions shown at the position display screen, and change is indicated at block 478, with the possible results of yes or no at 480 and 482 respectively. Starting the scroll appears at 484 and provides for changing data in the first position to blanks and zeros at 486, blanking out of a symbol with instructions to enter a new symbol (e.g. ABC at 489) at 488 and "net set to zero" with instructions to enter a new net position (e.g. −15 at 491) at 490. Average price remains as indicated with instructions to enter a new average price (e.g. 142.50 at 493)at 492. Profit/Loss is blanked out as indicated at 496, with instructions to enter a new profit/loss (e.g. 15000 at 497). The scroll may be stopped and changes that were entered may be accepted into the system by use of the Enter key indicated at 63. The appearance of the original display is indicated at 500.

Turning next to FIG. 4e, reference is first made to the "are you sure?" block at 502 with the yes and no alternatives being indicated at 504 and 506. The zeroing of all positions and appropriate registers are indicated at 507. Block 508 provides the scrolling through all positions asking for current prices (e.g. 141.05 when YXH appears on TDS) and block 510 indicates volatility, interest rate, realized profit/loss, unrealized profit/loss and total profit/loss with appropriate examples.

Block 512 indicates risk-free interest rate (e.g. 7.5) and block 514 indicates scrolling through positions for volatility changes (e.g. 25 when YXH appears on TDS. These two factors have to do with option valuations.

Figure 4F:
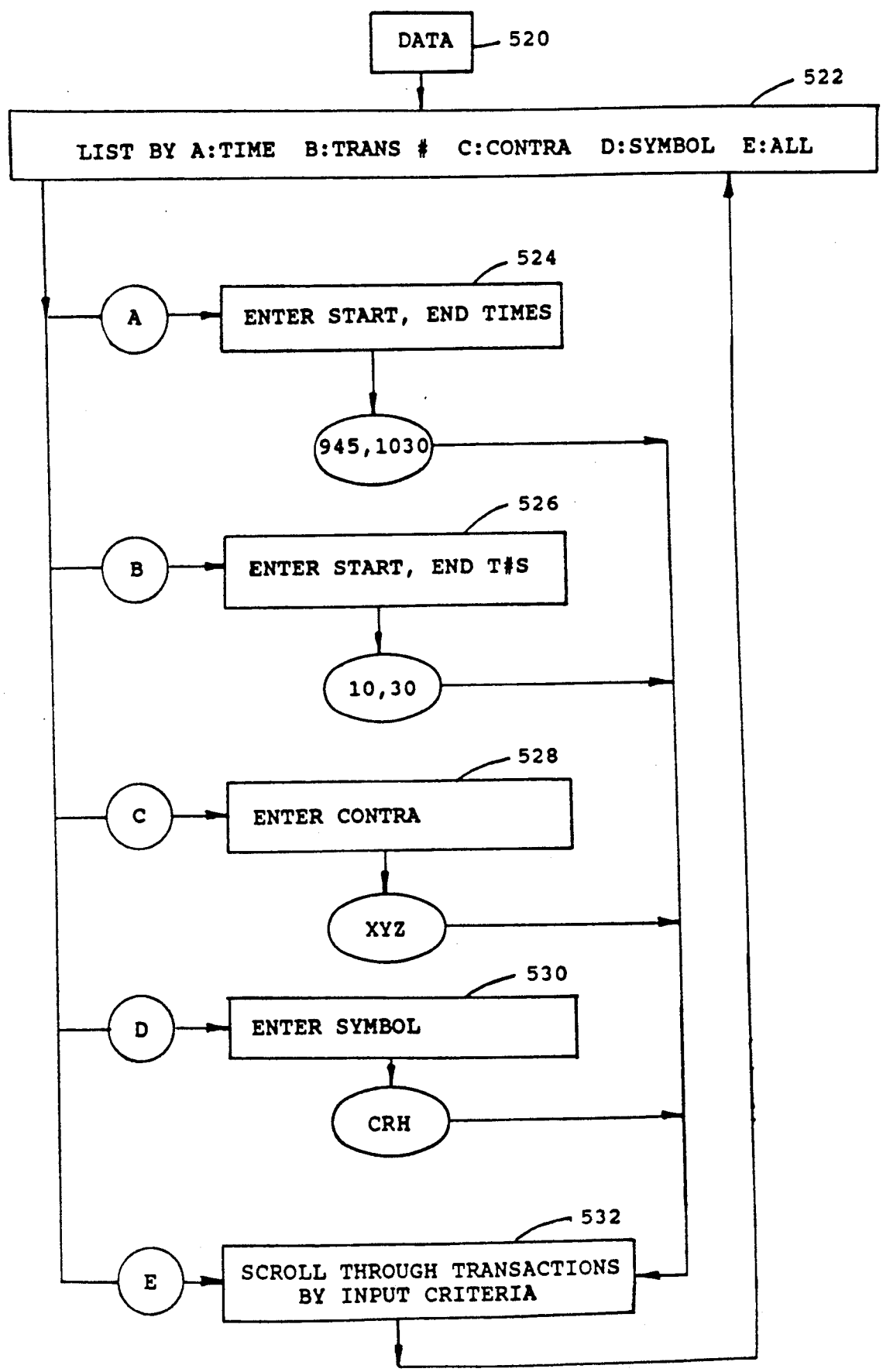

FIG. 4f deals with data key logic, the keying operation being indicated at 520. Block 522 indicates the various choices a trader may make as to how he retrieves the transaction data stored within the PTS. He may do so by ranges of time, transaction number, contra symbol and scrolling through all stored transactions. These are subdivided, as shown by blocks 524, 526, 528 and 530 into the separate entries which are required. Block 532 indicates the specific scrolling operation that implements the trader's request.

Figure 4G:
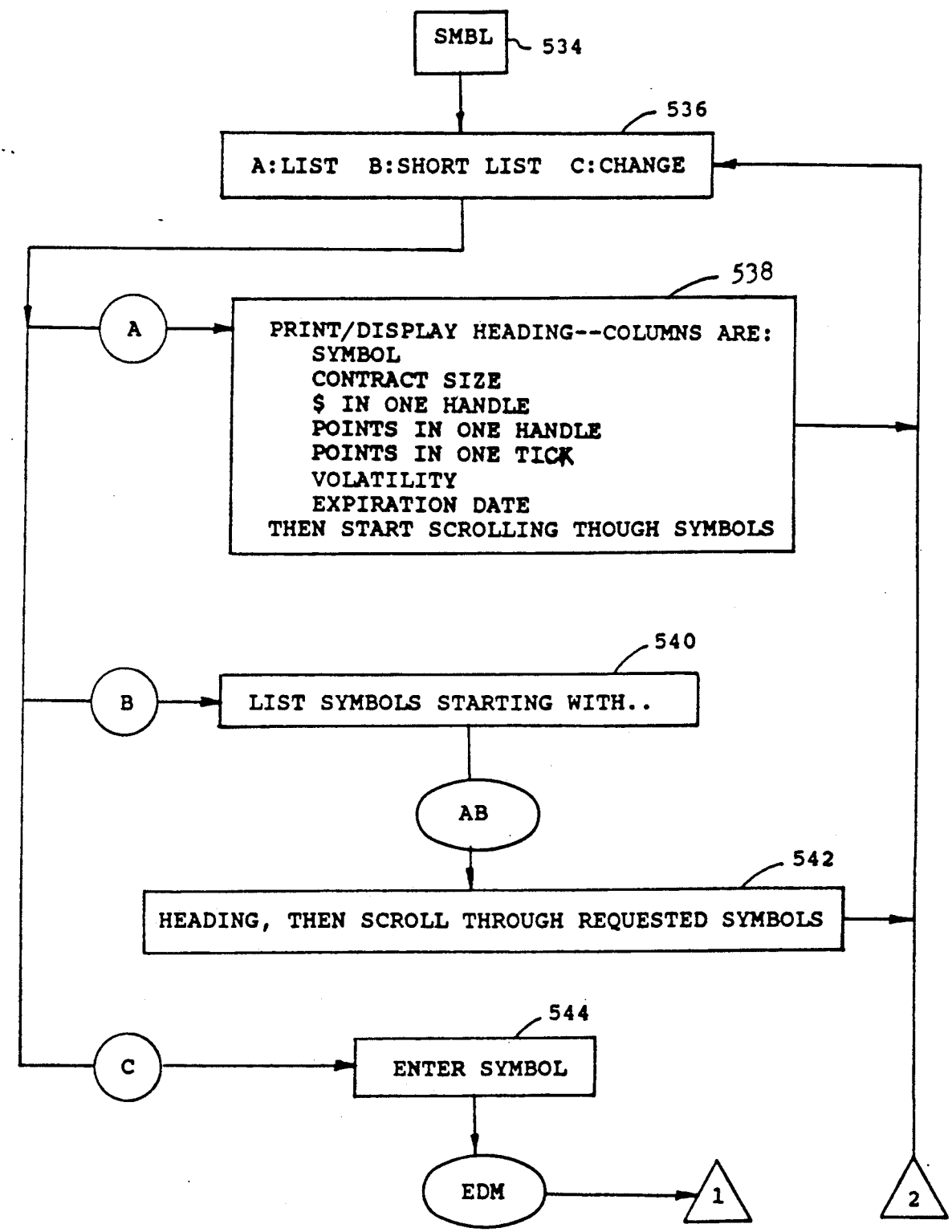

FIG. 4g indicates the symbol key logic, with the keying operation being indicated at 534. Block 536 indicates the choices the trader may make; i.e., list, short list and change. Block 538 indicates the print/display heading with the columns being symbol, contract size, handle dollars, handle points, tick points, volatility and expiration date. Scrolling takes place through each symbol. Block 540 indicates that listing of the symbols should only include symbols starting with the next entered letters (e.g. AB) and block 542 indicates scrolling through requested symbols. Block 544 refers to the request for entry of a specific symbol which should have one or more of its data items changed.

Figure 4H:
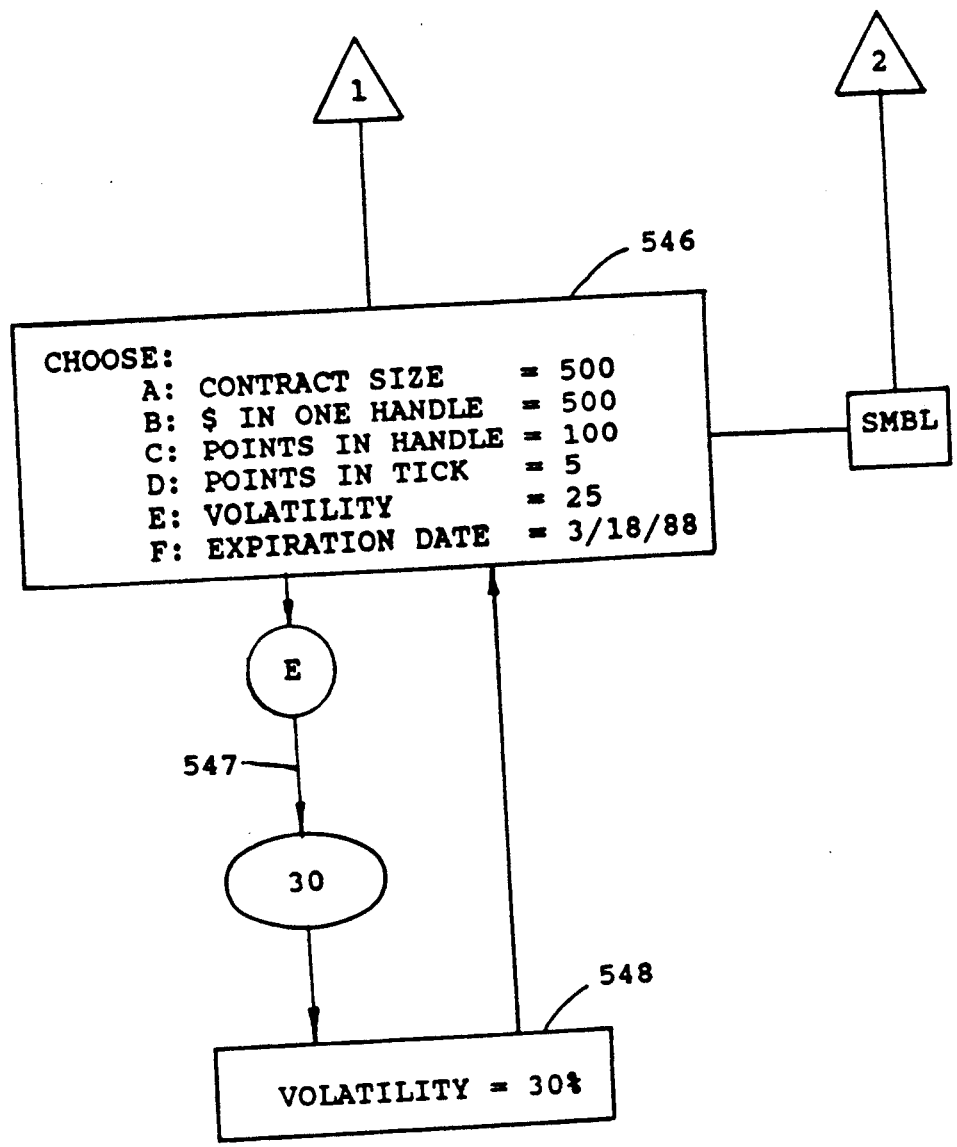

The flow diagram of FIG. 4g continues in FIG. 4(h) whereat block 546 indicates the trader's selection for change of contract size, handle dollars, handle points, tick points, volatility and expiration date (e.g. choice E meaning volatility and 30 meaning volatility =30%) as indicated by flow path 547 and Block 548.

Figure 4I:
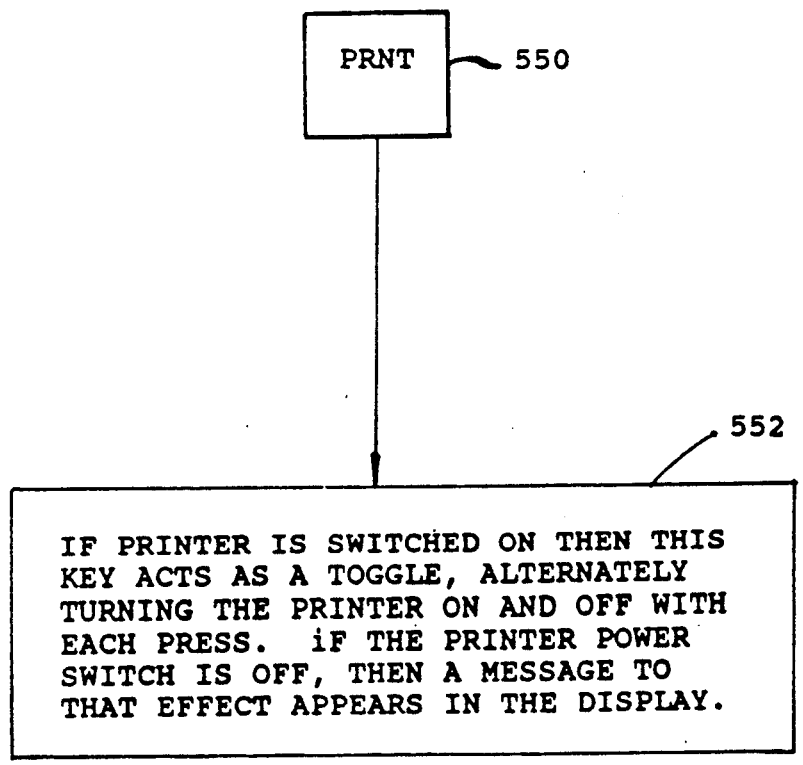

FIG. 4i indicates usage of the print key at 550. Block 552 indicates that if the printer is switched on then the key acts as a toggle, alternatively turning the printer on and off with each operation. If the printer power switch is off, then a message to that effect appears in the appropriate display.

Figure 4J:
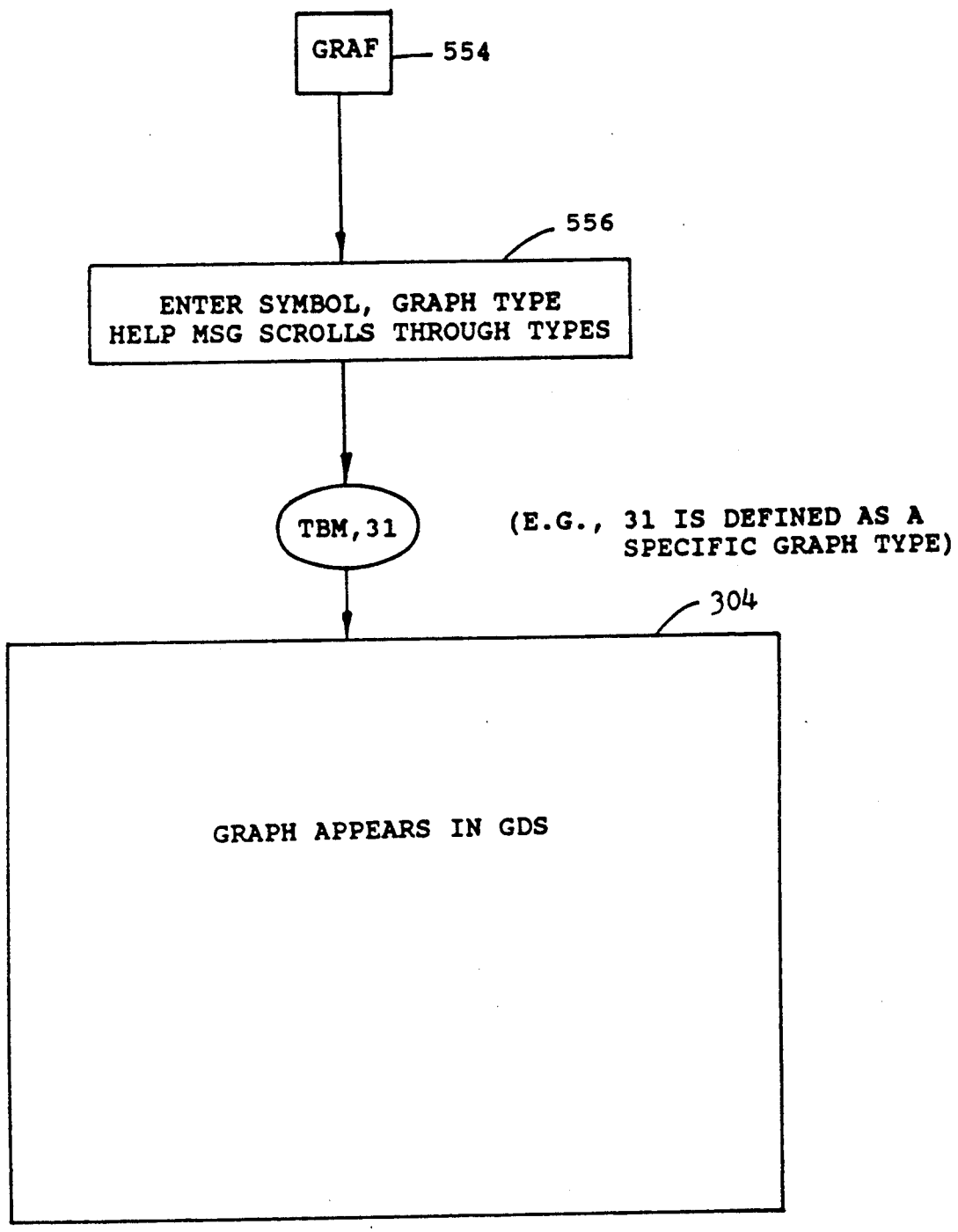

FIG. 4j indicates the graphic key logic with the keying operation being indicated at 554. Entry of the symbol and graph type desired is indicated at 556, and the graph appearing in the graph display screen appears represented at block 304.

Figure 4K:
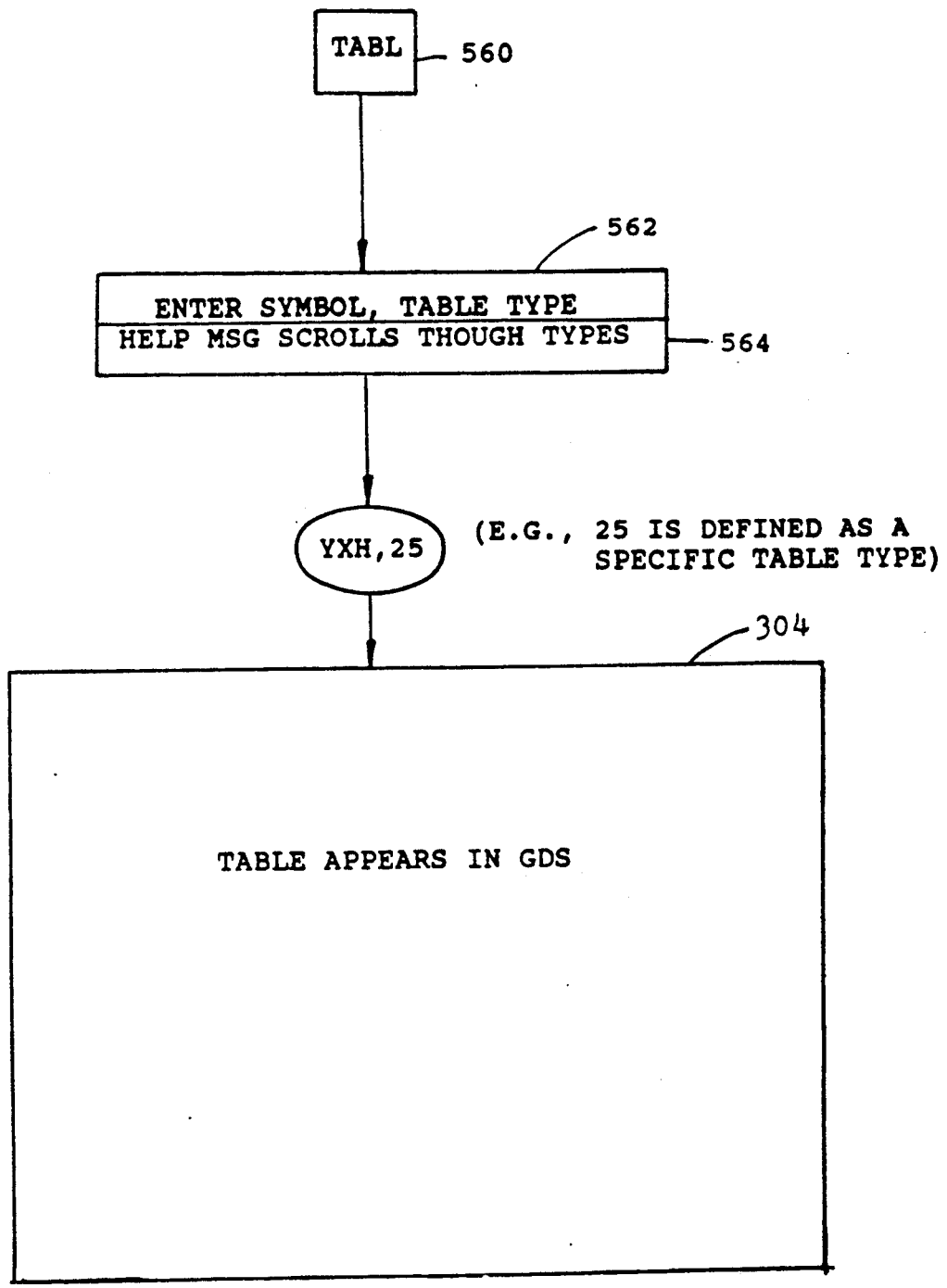

According to FIG. 4k, the table key logic operation or keying is indicated at 560. The entry of the symbol and request for type of table is indicated at 562 (e.g. YXH, 25) and scrolling through the various types is indicated at 564. The table appearing on the graphic display screen is indicated at 304.

Figure 5:
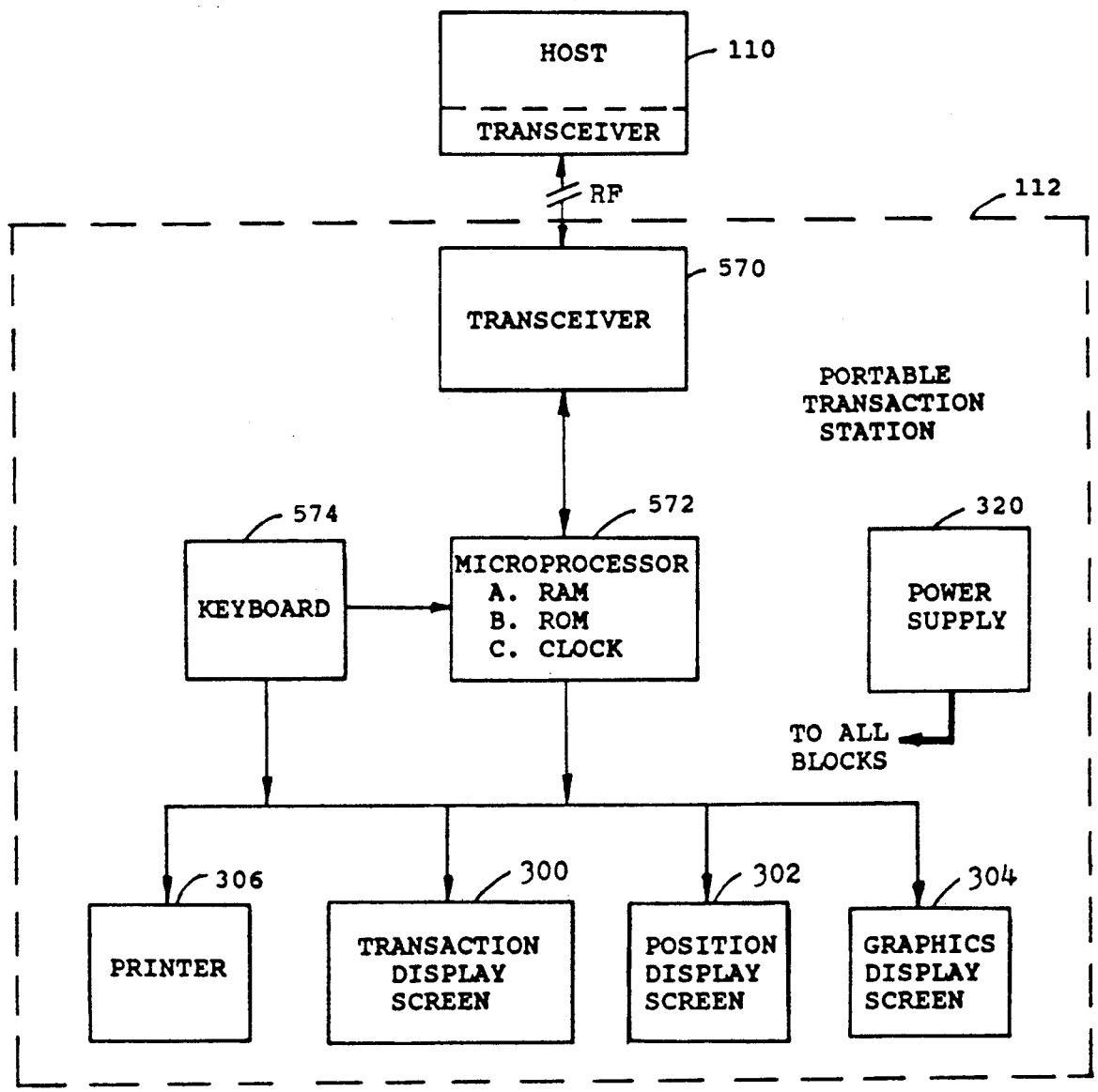
FIG. 5 is a block diagram of a portable transaction station provided in accordance with a preferred embodiment of the invention.

The block diagram of the portable transaction station appears in FIG. 5. In FIG. 5 appears the host 110 and a portable transaction station such as, for example, portable transaction station 112. The transceiver of the station 112 is indicated at 570, with the microprocessor of this station being indicated at 572. As indicated, the microprocessor may include various components, including RAM's, ROM's and a clock. The keyboard is indicated diagrammatically at 574, with the printer being indicated diagrammatically at 306. The transaction display screen is indicated diagrammatically at 300 and the position display screen is indicated diagrammatically at 302. The printer transaction display screen and position display screen have been discussed previously with respect to FIG. 3. The graphics display screen on the reverse side of the portable transaction station is indicated at 304 and is as indicated in FIG. 3b. The power supply is indicated diagrammatically at 320.

Figure 6:
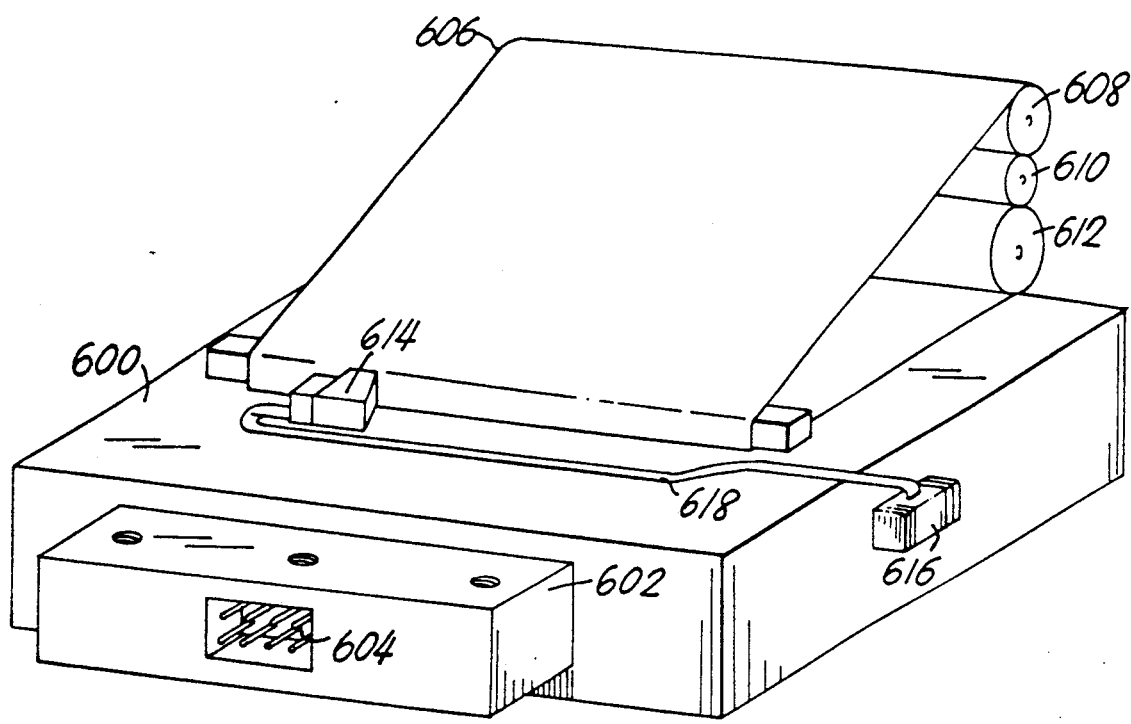
FIG. 6 is a diagrammatic perspective view of a fragmentary portion of a detachable printer for a portable transaction station illustrating some of the mechanical and electrical features thereof.

In FIG. 6 is illustrated in perspective and in generally diagrammatical form a printer to be detachably connected with a portable transaction station of the invention. This structure includes a main body 600 and a supplemental section 602 incorporating therein a connector 604. The paper upon which printing is effected is indicated at 606, passing over a take-up reel 608 and passing along an idler roller 610. The source of paper is indicated as a roll 610 and spring loaded arms are provided to hold the paper rollers. A multi-wire printhead is indicated at 614, with an electrical connector appearing at 616. Connection is made between the electrical connector and the multi-wire print head via ribbon wire arrangement 618.

Figure 7:
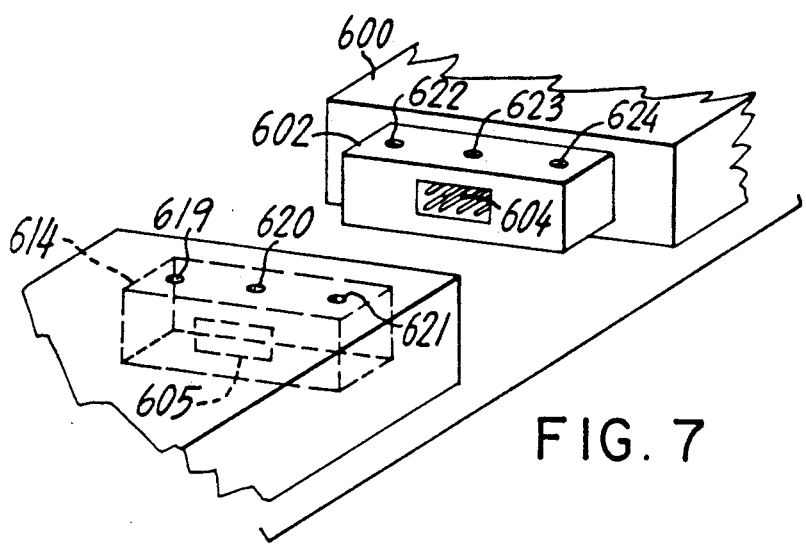
FIG. 7 is a perspective view of a fragmentary portion of the station of FIG. 6, illustrating the detachable printing station connection.

The manner in which the printer fits into the portable transaction station appears in FIG. 7 whereat is seen the main body 600 of FIG. 6 and the supplemental section 602 along with male connectors 604. The portable transaction station is indicated at PTS with the female connector being indicated at 605. Screws indicated at 619, 620 and 621 engage threaded opening 622, 623 and 624 to lock the printer to the portable transaction station in secured but detachable manner.

Figure 8:
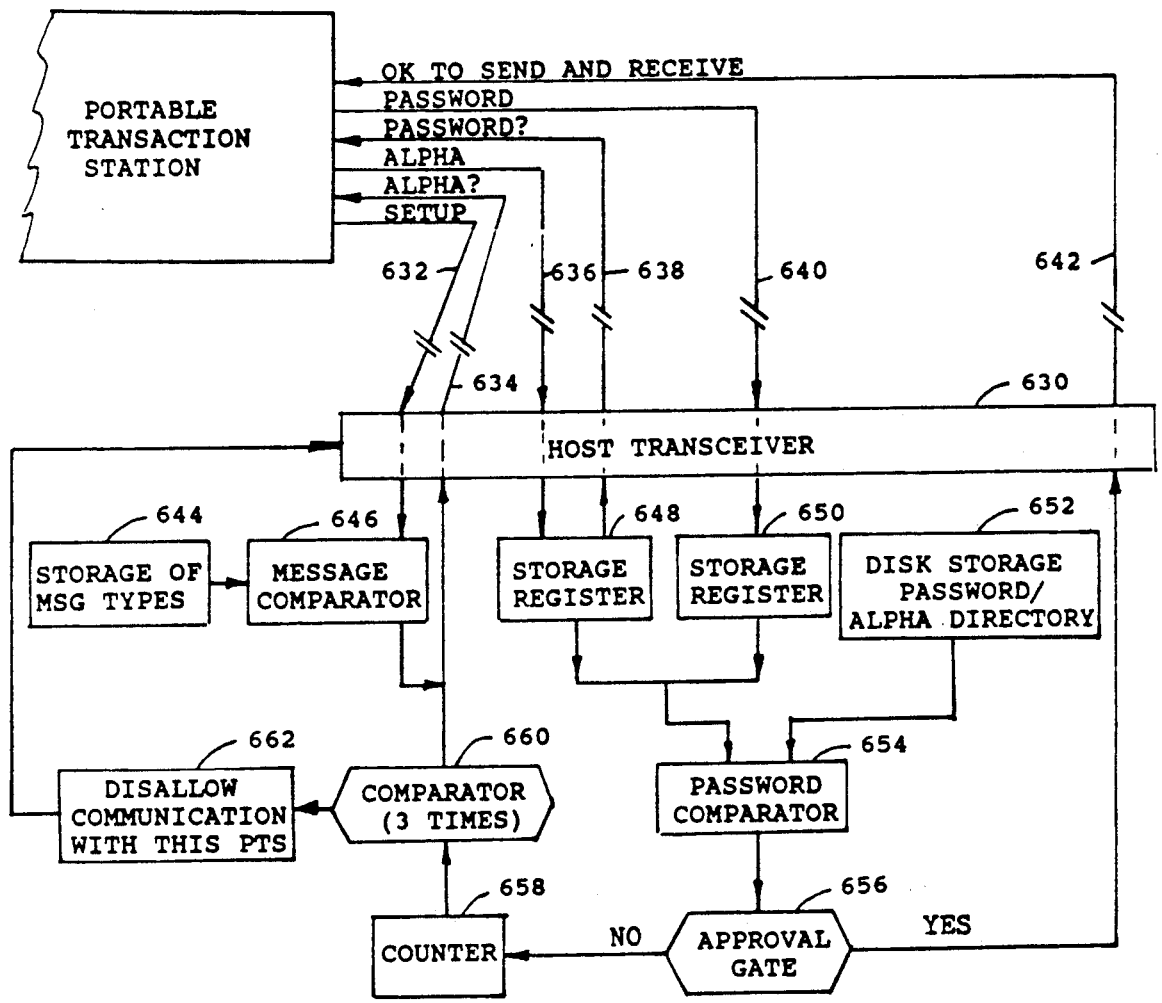
FIG. 8 is a block diagram in combination with a flow diagram illustrating a security system provided in accordance with the invention.

FIG. 8 illustrates the security system of the invention and includes a Portable Transaction Station. The setup line is indicated at 632, being connected to the host transceiver 630 which transmits to and from the various components of the associated host. Lines 634 and 636 are alpha lines. Line 634 is a transmission from the host transceiver back to the Portable Transaction Station asking for the alpha, while 636 is the line which leads from the Portable Transaction Station to the host transceiver for the introduction of the alpha into the host. Lines 638 and 640 are password lines, line 638 passing from the host transceiver back to the Portable Transaction Station, whereas line 640 provides for transmission of the password through the host transceiver into the host. Line 642 is an indication of communication of a signal indicating that it is alright to send and receive, this signal leading to a display in the Portable Transaction Station.

Included in the host, for purposes of dealing with the security system, are the storage 644 for message types and the message comparator 646. There are a pair of storage registers 648 and 650 and a disk storage passwords/alpha directory 652. A password comparator 654 receives signals from directory 652 as well as from storage register 650 and 648. Storage register 648 communicates bi-directionally with host transceiver 630, whereas storage register 650 can only receive signals from the host transceiver 630.

An approval gate 656 is included in the host; a yes signal is transmitted as indicated to the host transceiver 630 from gate 656, while a no signal is transmitted to a counter 658 which leads to a comparator 660. Signals from comparator 660 pass to a disallowance circuit 662 which, in turn, communicates with the host transceiver 630 to give a corresponding indication to the portable transaction station.

Figure 9:
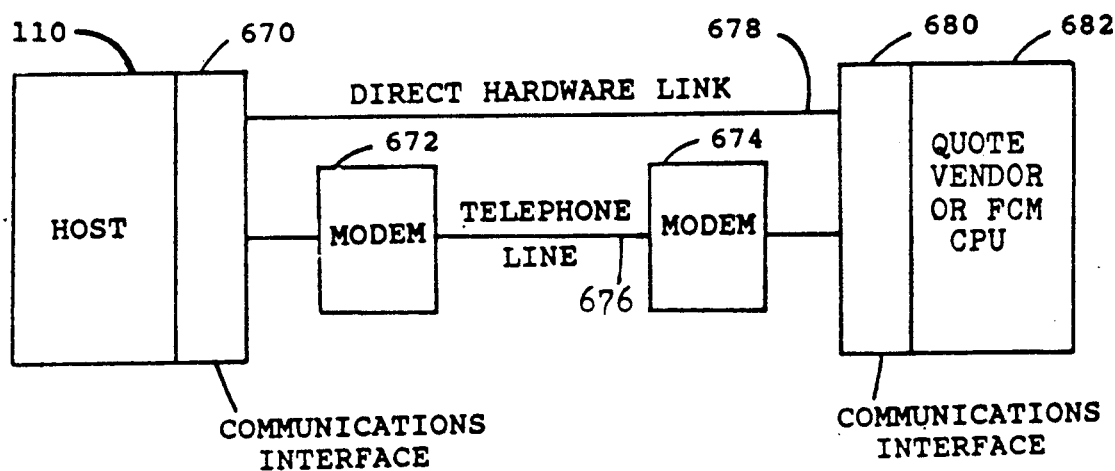
FIG. 9 is a block diagram illustrating how prices, volume and quotes are sent to quote vendors in accordance with the invention.

In FIG. 9 is illustrated a block diagram showing how prices, volume and quotes may be sent to quote vendors or how transaction data are sent to FCMs in accordance with the invention. Therein appears the host 110 with the communications interface being indicated at 670. Modems appear at 672 and 674 being inter-connected by a telephone line 676. Alternatively, or in addition, a direct hardware may link 678 connect the communications interface 670 with communications interface 680 which is included in, or connected with, the remote CPU 682 which may belong to a quote vendor or an FCM. The general manner in which quotes are generated and forwarded to the quote vendor have been described hereinabove.

Figure 10:
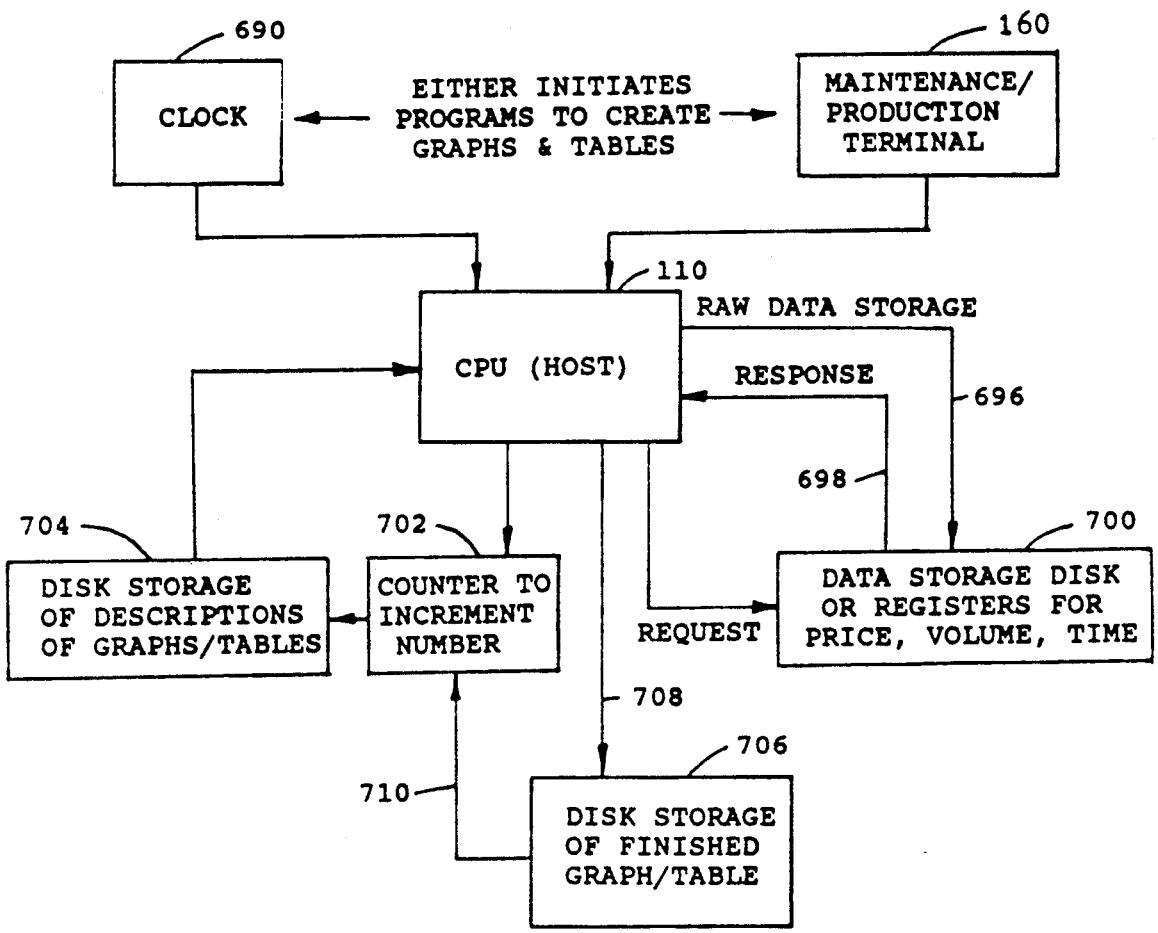
FIG. 10 illustrates a block diagram relating to the creation of graphic and tabular presentations of data in accordance with the invention.

FIG. 10 is a block diagram illustrating the creation of graphs and tables for purposes of being available to portable transaction stations and displayed on appropriate screens therein. FIG. 10 shows circuitry including a clock 690 and a maintenance/production terminal 160 coupled with the CPU or host 110. Raw data storage information passes along line 696 and responses are passed along line 698. Lines 696 and 698 are connected to data storage registers or disk for price, volume and time circuitry indicated at 700. This circuitry which relates to the creation of graphs and tables furthermore includes a counter 702 which increments type number and a disk storage of descriptions of graphs and tables as indicated at 704. The circuitry, moreover, includes a disk storage of finished graphs and tables as indicated at 706. The disk storage 706 is connected with the host by line 708 and feeds its signals to counter 702 via line 710.

Figure 11:
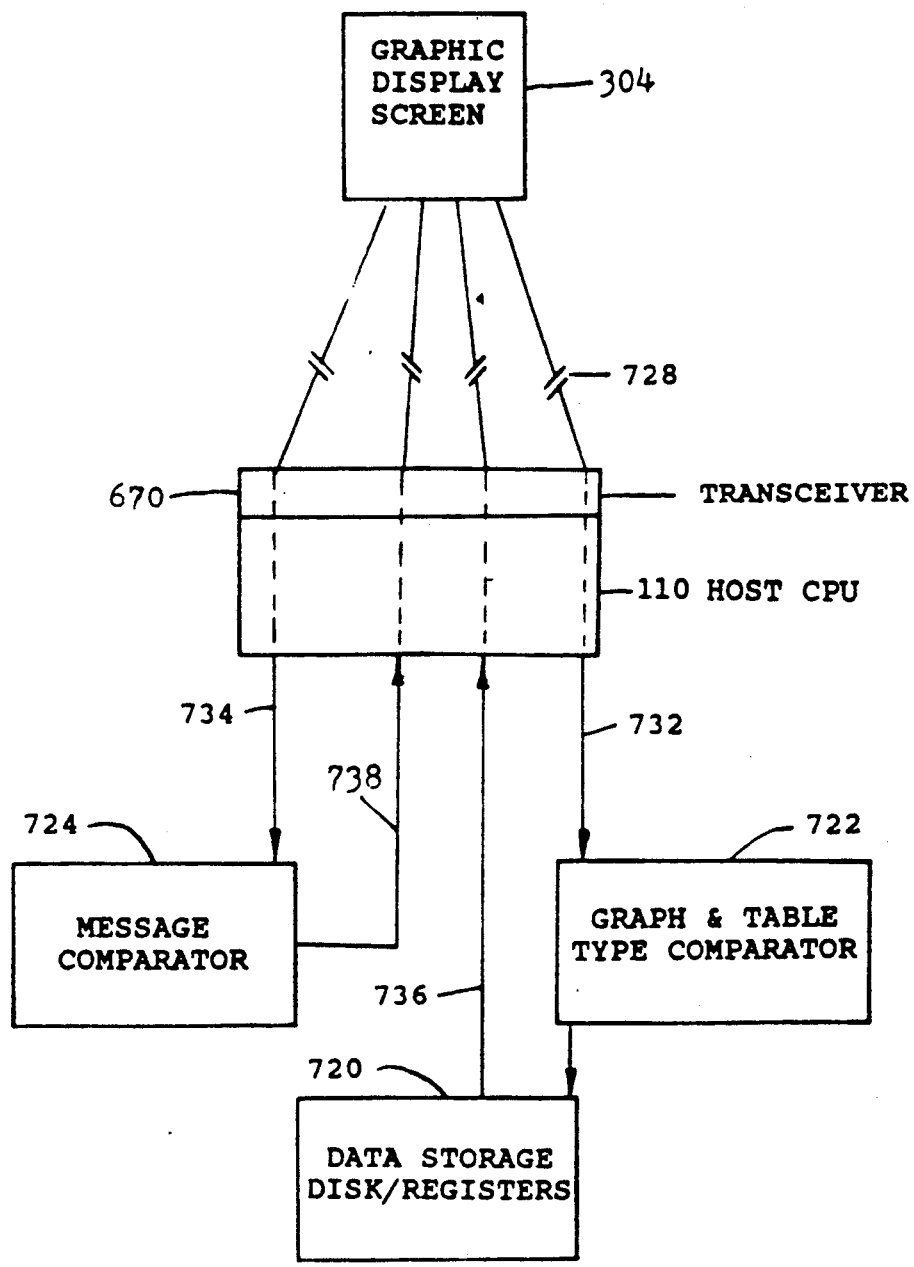
FIG. 11 illustrates in generally block diagram form the retrieval of graphs and tables related to FIG. 10.

FIG. 11 illustrates the circuitry used for retrieval of graphs and tables. The data storage is indicated at 720, and the graph and table type comparator is indicated at 722. A message interpreter circuit is indicated at 724. The host CPU 110 includes its transceiver 670. Radio transmission is indicated at 728 and a GDS display is indicated at 304. The host is connected via line 732 with comparator 722 and via line 734 with message interpreter 724. Signals are fed to the GDS 304 via the host 110 from the data storage at 720 and message interpreter 724 respectively via lines 736 and 738.

Figure 12:
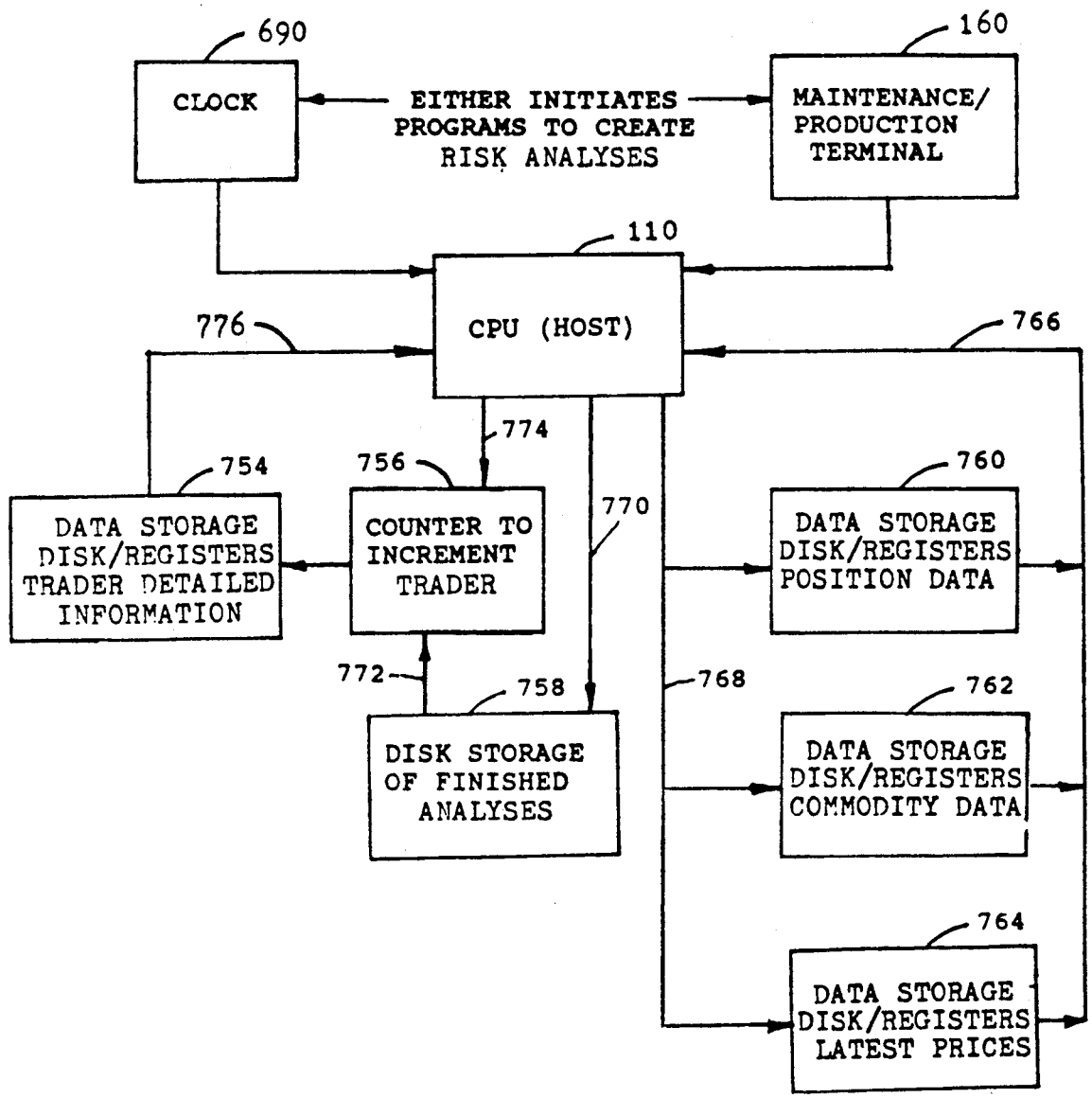
FIG. 12 is a block diagram illustrating risk analysis provided for in accordance with the invention.

FIG. 12 is a block diagram of risk analysis. In this figure is indicated the host 110 associated with a clock 690 and a maintenance/production terminal 160. The circuit further includes a disk storage 754 of trader detailed information and a counter 756 to increment to the next trader. Disk storage at 758 is provided for complete analyses. The overall circuit, moreover, includes data storage, either disks or registers, 760 of trader's position data, similar storage 762 of commodity data and similar storage 764 of latest prices. Storage circuits 760, 762 and 764 are connected via line 766 to host 110 and for the transfer of information thereto. Signals are received by these storage circuits from the host 110 via line 768. Disk storage 758 receives information from the host 110 via line 770 and transmits signals via line 772 to the counter 756. Signals are fed from host 110 to counter 756 via line 774. Signals are, moreover, transmitted from data storage 754 via line 776 to host 110.

Figure 13:
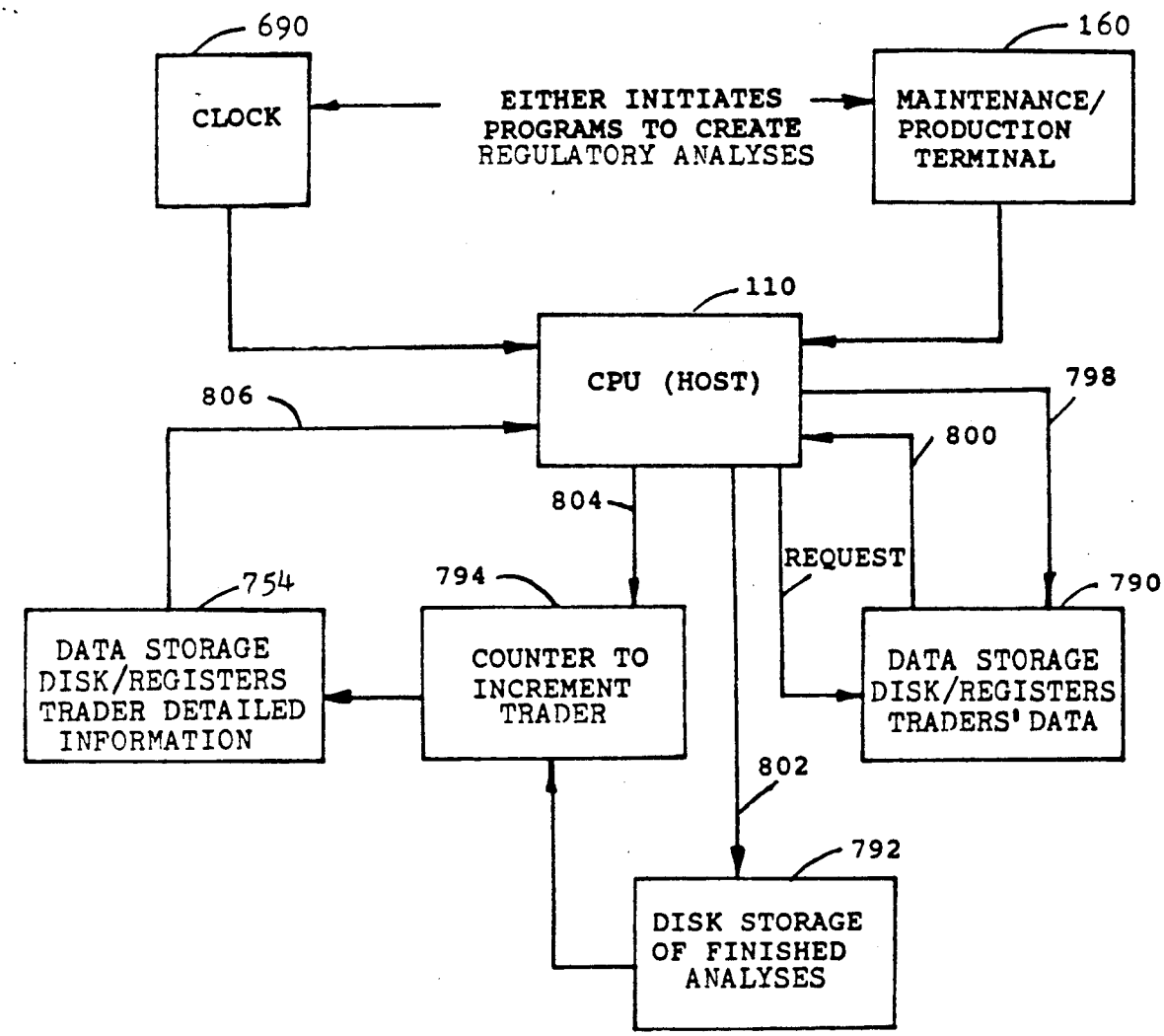
FIG. 13 is a block diagram illustrating an example of regulatory analysis provided for in accordance with the invention.

FIG. 13 illustrates block diagram of regulatory analysis. Trader response time is the example illustrated. In this figure once again appears the host 110 and maintenance/production terminal 160 as well as clock 690. This circuit also includes data storage 790, either registers or disk, for trader's data. Also included is a disk storage 792 of complete analyses, and a counter 794 to increment to the next trader. A disk storage 754 for trader detailed information is also included. Some of these storage circuit counters and the like may be the same circuits illustrated in FIG. 12, or may be entirely separate therefrom, depending upon the storage capabilities of the same. Real time data is passed by host 110 to data storage 790 via line 798 and the response is passed via line 800 from data storage 790 to host 110. Signals are transmitted via lines 802 and 804 from the host 110 to the disk storage 792 and counter 794 respectively. Signals generated by disk storage 754 are transmitted via line 806 to the host 110.

In accordance with the method of the invention, there is generally contemplated a method relating to the buying and selling of items having variable buying and selling prices. This method comprises opposing traders agreeing to prices on commodities or other such items, the traders converting the agreed prices into signals which are transmitted to a common host station which then compares the signals and, according to the comparison, records reconciled and unreconciled transactions. More specifically, signals indicating unreconciled transactions are transmitted to the opposing traders with the option being available for the traders to transmit correction signals to the common host station to convert unreconciled transactions to reconciled transactions.

The unreconciled transactions noted above causes the host station to generate signals to be transmitted to quote vendors. Traders may also transmit bid and ask signals to the host station, which are transmitted by the host station to the quote vendors for distribution to the public.

There will now be obvious to those skilled in the art many modifications and variations of the structures, systems and methods set forth hereinabove. These modifications and variations will not depart from the scope of the invention if defined by the following claims.

What is claimed is:

1. A system for processing open outcry transactions between opposing traders, said system comprising a plurality of portable transaction station means for converting manually entered data relating to said open outcry transactions into first transmissible signals and transmitting said first signals, and for receiving second signals and converting the said second signals into visually perceptible displays, utilization means for producing information relating to said transactions, and host means for receiving and processing said first signals and for transmitting said second signals, said host means including processing means for reconciling first signals representing agreed buy and sell transaction data entered by traders with first signals representing agreed buy and sell transaction data entered by opposing traders and for determining correspondence between the agreed buy and sell transaction data entered by traders with agreed buy and sell transaction data entered by opposing traders, said host means including means for transmitting second signals relating to said correspondence to said portable transaction station means, said host means further including means for transmitting data relating to said transactions to said utilization means in at least substantially real time, said first signals respectively including portions identifying traders and opposing traders in agreed transactions, said second signals including portions identifying traders and opposing traders to whom the second signals are transmitted to indicate reconciliation or lack of the same.

2. A system as claimed in claim 1, wherein said utilization means comprises futures commission merchant means and quote vendor means, said host means including means for transmitting data relating to said transactions to said futures commission merchant means and said quote vendor means.

3. A system as claimed in claim 1 wherein said portable transaction station means and host means include radio transmission and reception means to transmit and receive said signals.

4. A system as claimed in claim 1 wherein said portable transaction station means include means for detachable connection to the traders.

5. A system as claimed in claim 4 wherein the means for detachable connections includes a wrist strap on each said portable transaction station means.

6. A system as claimed in claim 4 wherein said portable transaction station means include programmable means for the updating of the portable transaction station means.

7. A system as claimed in claim 1 wherein said portable transaction station means include portable casings, key means on said casings for the manual entry of data relating to transactions, and activating means for selectively activating and deactivating the related portable transaction stations means.

8. A system as claimed in claim 7 wherein the activity means is recessed to prevent accidental activating and deactivating of the portable transaction station means.

9. A system as claimed in claim 7 wherein said key means include bid and asked key means for reporting quotes in addition to transactions.

10. A system as claimed in claim 7 wherein said key means include means for entering data relating to identification of the identity of the enterer of the data, identity of the item which is the subject of the transaction, and whether the transaction is buy or sell, volume, price, time, date, FCM identity, contra, transaction number and whether the transaction was done as principal or agent.

11. A system as claimed in claim 7 wherein said portable transaction station means include detachable printing means for selectively printing data entered into and received by the related portable transaction station means, and activating means for selectively activating and deactivating the printing means.

12. A system as claimed in claim 7 wherein said portable transaction station means include respective transaction display screens for displaying visually perceptible data relating to transactions.

13. A system as claimed in claim 12 wherein said portable transaction station means include respective position display screens for displaying visually perceptible data relating to positions.

14. A system as claimed in claim 12 wherein the portable transaction stations means are adapted to work according to selected plurality of means, said portable transaction station means including menu storage means and means for selectively calling up menus from said storage means.

15. A system as claimed in claim 7 wherein said portable transaction station means include respective position display screens for displaying visually perceptible data relating to positions.

16. A system as claimed in claim 7 wherein the key means include means to control scrolling speed.

17. A system as claimed in claim 7 wherein the key means include clear-last-digit keys, handle-up and handle-down keys, and tick-up and tick-down keys.

18. A system as claimed in claim 7 wherein said portable transaction station means include means for the automatic entry of transaction numbers.

19. A system as claimed in claim 7 wherein the key means includes means for automatically negating a transaction and for automatically voiding a transaction.

20. A system as claimed in claim 7 wherein said portable transaction station means include means for the printing out of data relating to transactions, positions, average cost and profit/loss.

21. A system as claimed in claim 7 wherein said portable transaction station means include means for the dating of the transactions.

22. A system as claimed in claim 21 wherein said host means includes means for the automatic time stamping of the transaction.

23. A system as claimed in claim 7 wherein said portable transaction station means include means for the computation of net position, average cost, realized profit/loss, unrealized profit/loss, and total profit/loss for all positions.

24. A system as claimed in claim 1 wherein said portable transaction station means include opposite sides and data entry control means on the fronts and sides of the portable transaction station means.

25. A system as claimed in claim 1 wherein said host means includes means for the automatic time stamping of the transaction.

26. A system as claimed in claim 1 wherein said host means includes security means for preventing the unauthorized use of any of said portable transaction station means.

27. A system as claimed in claim 1 wherein said host means includes communication control means for identifying which portable transaction station means is sending data and to which portable transaction station means the host means should transmit responses.

28. A system as claimed in claim 1 wherein said host means includes storage means for storing all trades, reconciled trades and unreconciled trades.

29. A system as claimed in claim 1 wherein said host means includes means for the storage and continual monitoring of trader accounts.

30. A system as claimed in claim 1 wherein said host means includes means for the analysis of unusual trading patterns.

31. A system as claimed in claim 1 wherein said host means includes means for generating graphical analysis of stored data.

32. A system as claimed in claim 1 wherein said host means includes means for broadcasting news items.

* * * * *